(12) United States Patent
Rofougaran

(10) Patent No.: US 8,175,185 B2
(45) Date of Patent: *May 8, 2012

(54) RF POLAR TRANSMITTER AND INTEGRATED CIRCUIT WITH PROGRAMMABLE FILTER MODULE AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1058 days.

This patent is subject to a terminal disclaimer.

(21) Appl. No.: 12/029,471

(22) Filed: Feb. 12, 2008

(65) Prior Publication Data

US 2009/0202019 A1 Aug. 13, 2009

(51) Int. Cl.
*H04L 27/00* (2006.01)
(52) U.S. Cl. ............... 375/295; 365/192; 455/243.1; 455/311; 324/76.28
(58) Field of Classification Search .................. None
See application file for complete search history.

(56) References Cited

U.S. PATENT DOCUMENTS

| 5,794,131 A * | 8/1998 | Cairns ............................. 455/76 |
| 6,002,722 A * | 12/1999 | Wu ................................. 375/295 |
| 2005/0110568 A1* | 5/2005 | Robinson et al. ............. 330/151 |

* cited by examiner

*Primary Examiner* — David C. Payne
*Assistant Examiner* — Adolf Dsouza
(74) *Attorney, Agent, or Firm* — Garlick & Markison; Bruce E. Stuckman

(57) ABSTRACT

A radio frequency (RF) transmitter includes a transmitter processing module that generates a processed signal and a modulating signal based on outbound data. An up-conversion module up-converts the processed signal to generate an up-converted signal. A programmable filter module generates a first plurality of delayed signals from the up-converted signal and that generates a filtered up-converted signal by combining the up-converted signal and the first plurality of delayed signals, wherein a delayed signal of the first plurality of delayed signals is scaled based on one of a first plurality of coefficients, wherein the first plurality of coefficients are selected based on a control signal. A polar amplifier amplifies and amplitude modulates the filtered up-converted signal based on the modulating signal to generate a transmit signal. A processing module generates the control signal to attenuate at least one RF spur of the up-converted signal.

24 Claims, 20 Drawing Sheets

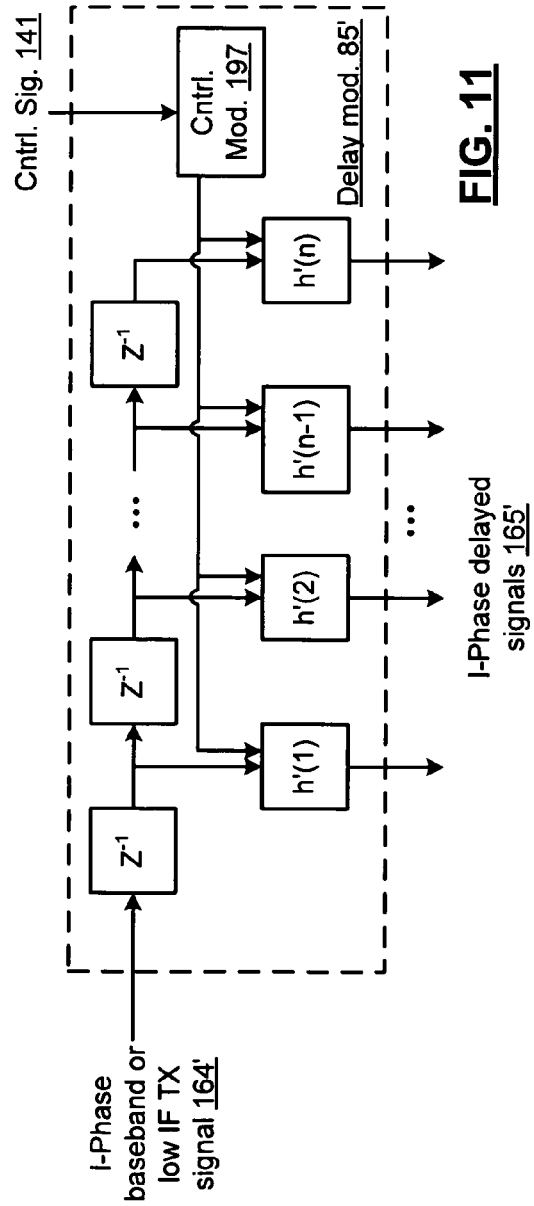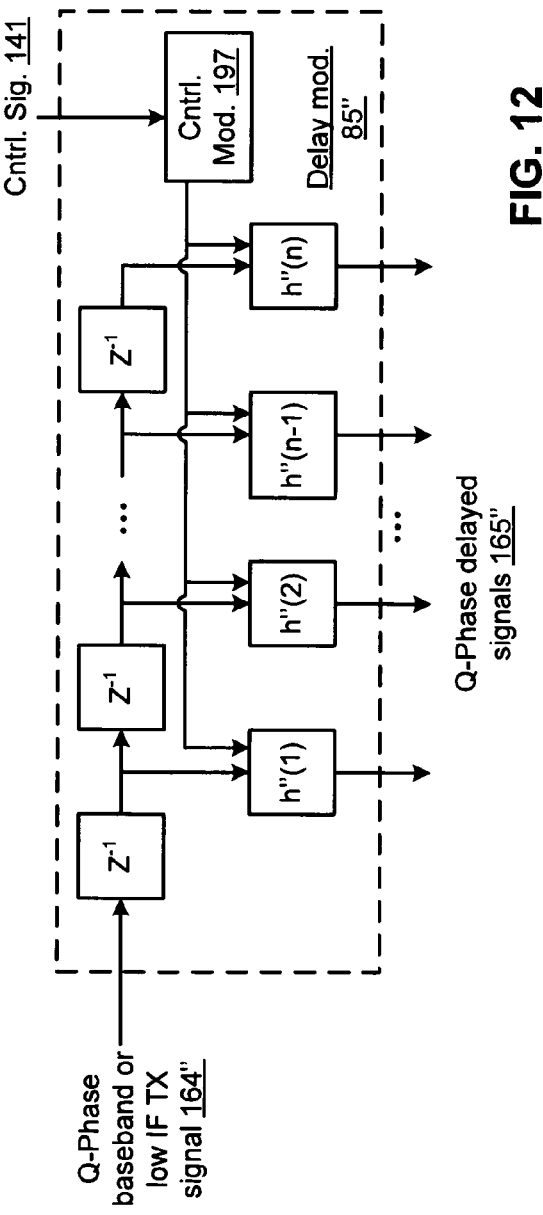

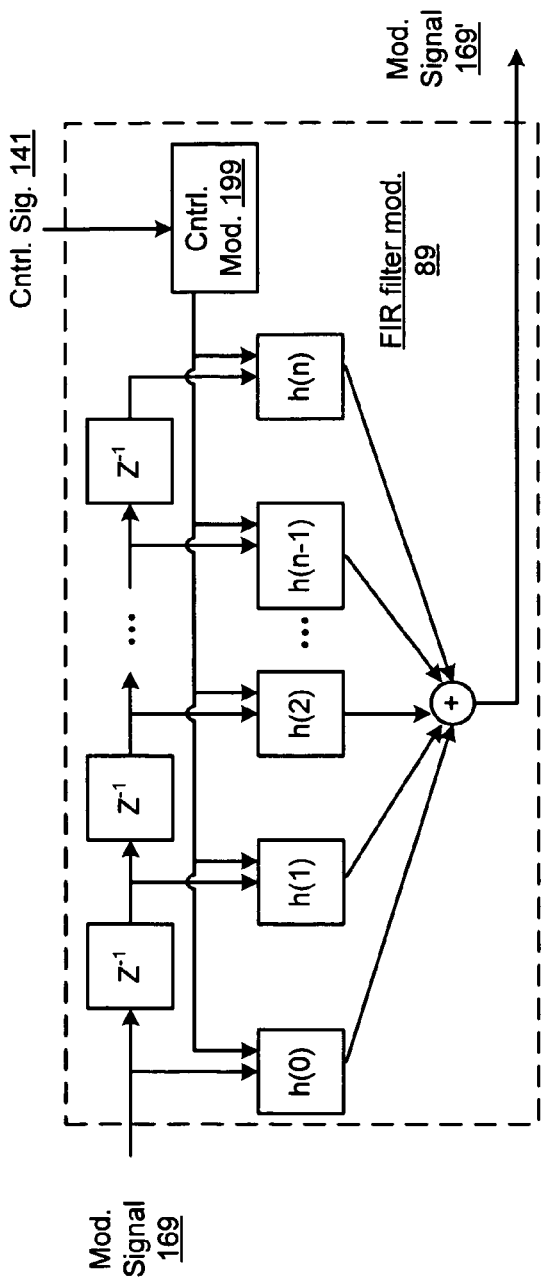
FIG. 17
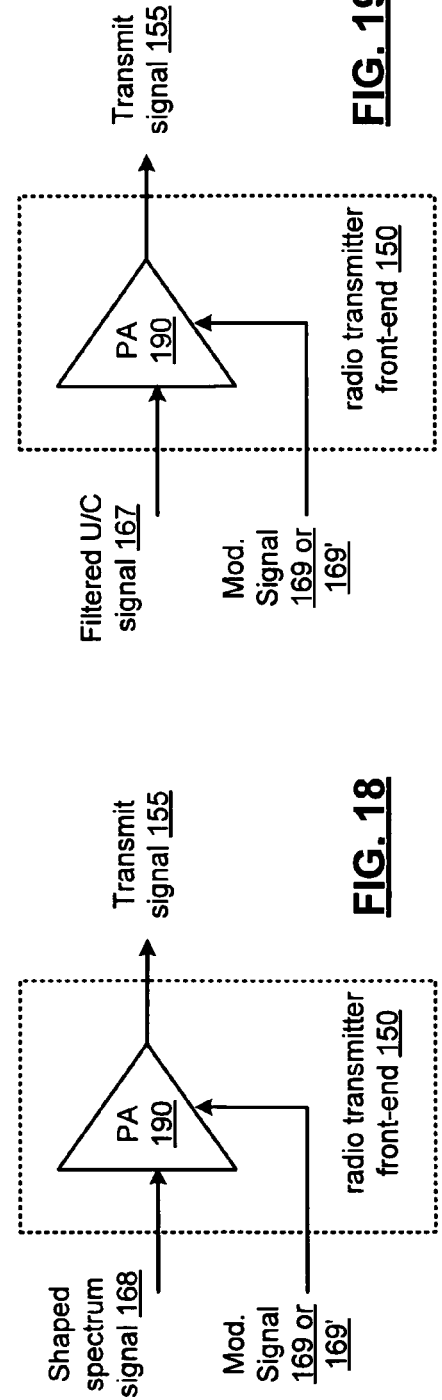
FIG. 19
FIG. 18

RF POLAR TRANSMITTER AND INTEGRATED CIRCUIT WITH PROGRAMMABLE FILTER MODULE AND METHODS FOR USE THEREWITH

CROSS-REFERENCE TO RELATED APPLICATIONS

The present application is related to the following applications:

U.S. Utility Patent Application Serial No. entitled "RF TRANSMITTER AND INTEGRATED CIRCUIT WITH PROGRAMMABLE FILTER MODULE AND METHODS FOR USE THEREWITH," having Ser. No. 12/026,495, filed on Feb. 5, 2008, pending;

U.S. Utility Patent Application Serial No. entitled "RF POLAR TRANSMITTER AND INTEGRATED CIRCUIT WITH PROGRAMMABLE BASEBAND FILTERING AND METHODS FOR USE THEREWITH", having Ser. No. 12/027,615, filed on Feb. 7, 2008, pending;

U.S. Utility Patent Application Serial No. entitled "RF TRANSMITTER AND INTEGRATED CIRCUIT WITH PROGRAMMABLE BASEBAND FILTERING AND METHODS FOR USE THEREWITH," having Ser. No. 12/029,458, filed on Feb. 11, 2008, pending.

BACKGROUND OF THE INVENTION

1. Technical Field of the Invention

This invention relates generally to mobile communication devices and more particularly to RF transmitter circuits used therewith.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna through an antenna interface and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

RF transmitters can generate polar coordinate transmissions that are simultaneously amplitude modulated and phase modulated to carry more data over a single transmitted signal. The can be performed in two phases with phase modulation occurring first in a phase locked loop and amplitude modulation being induced on the phase modulated signal by the power amplifier. While a flexible approach, the power amplifier must respond to a wide range of possible modulating signals. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 11 is a schematic block diagram of another embodiment of a delay module in accordance with the present invention;

FIG. 12 is a schematic block diagram of another embodiment of a delay module in accordance with the present invention;

FIG. 17 is a schematic block diagram of another embodiment of a filter module in accordance with the present invention;

FIG. 18 is a schematic block diagram of an embodiment of a radio transmitter front-end in accordance with the present invention;

FIG. 19 is a schematic block diagram of another embodiment of a radio transmitter front-end in accordance with the present invention;

DETAILED DESCRIPTION OF THE INVENTION

Figure 1:
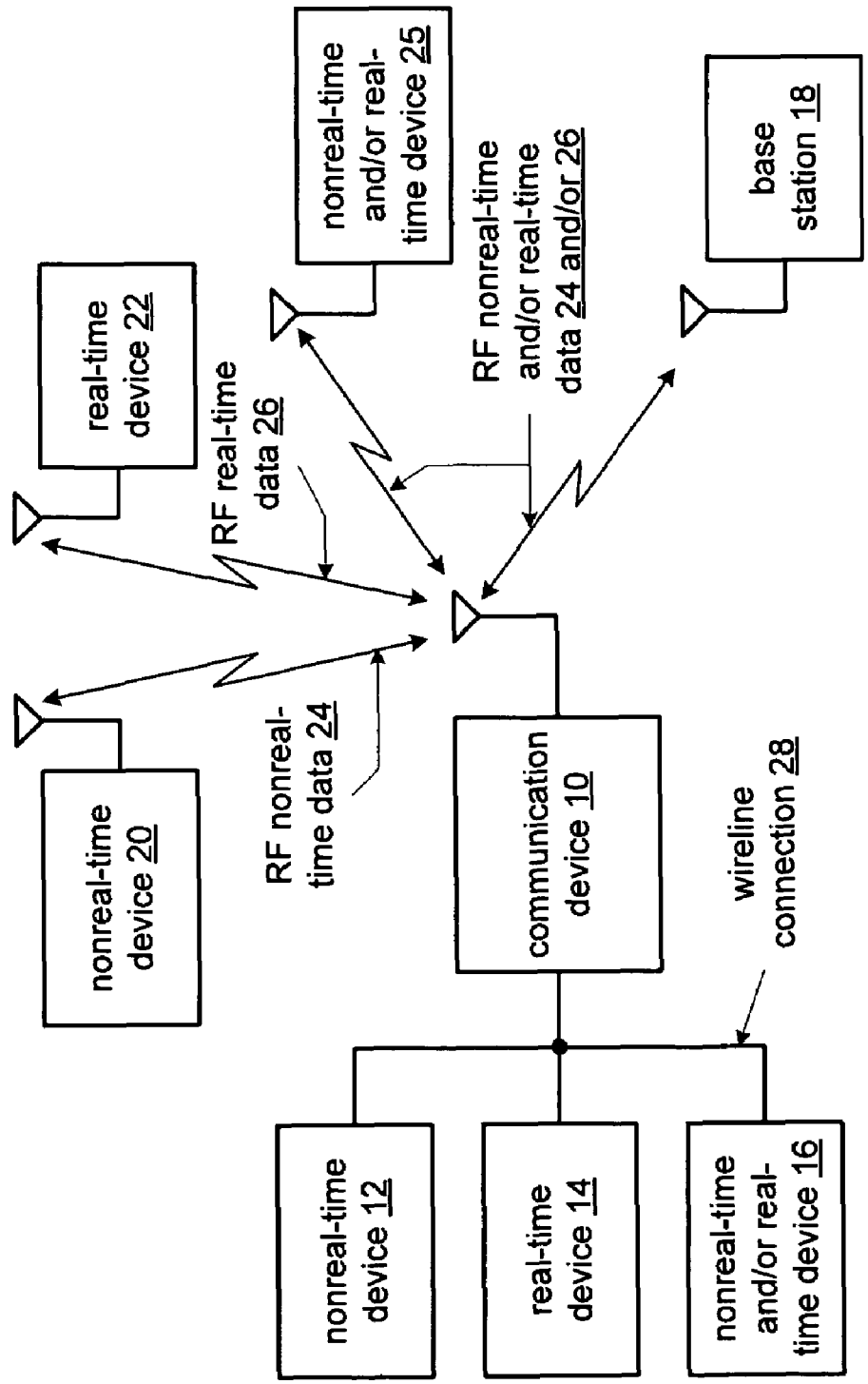
FIG. 1 is a schematic block diagram of an embodiment of a communication system in accordance with the present invention.

FIG. 1 is a schematic block diagram of an embodiment of a communication system in accordance with the present invention. In particular a communication system is shown that includes a communication device 10 that communicates real-time data 24 and non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as a combined voice, data and RF integrated circuit that includes one or more features or functions of the present invention. Such integrated circuits shall be described in greater detail in association with FIGS. 3-27 that follow.

Figure 2:
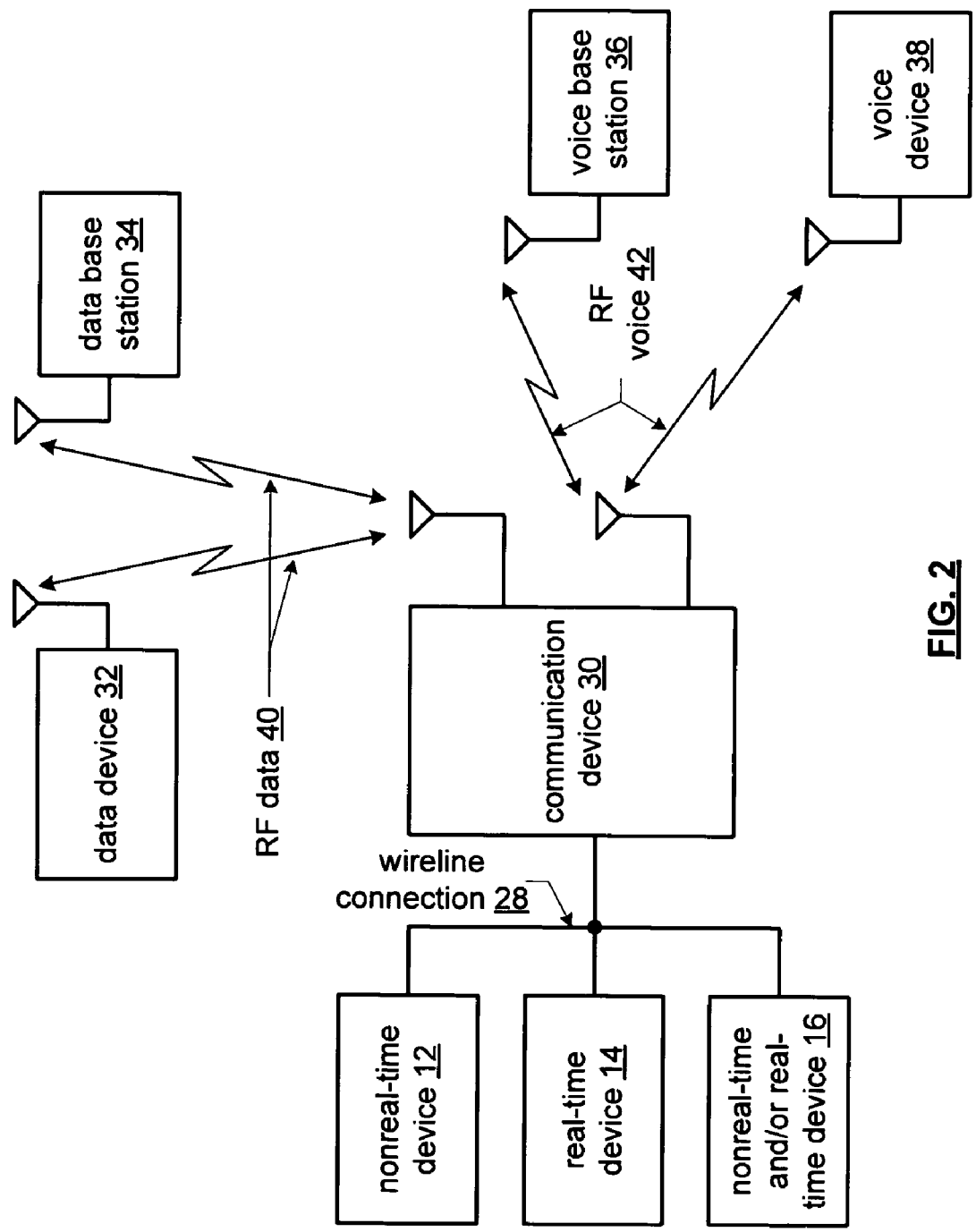
FIG. 2 is a schematic block diagram of an embodiment of another communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
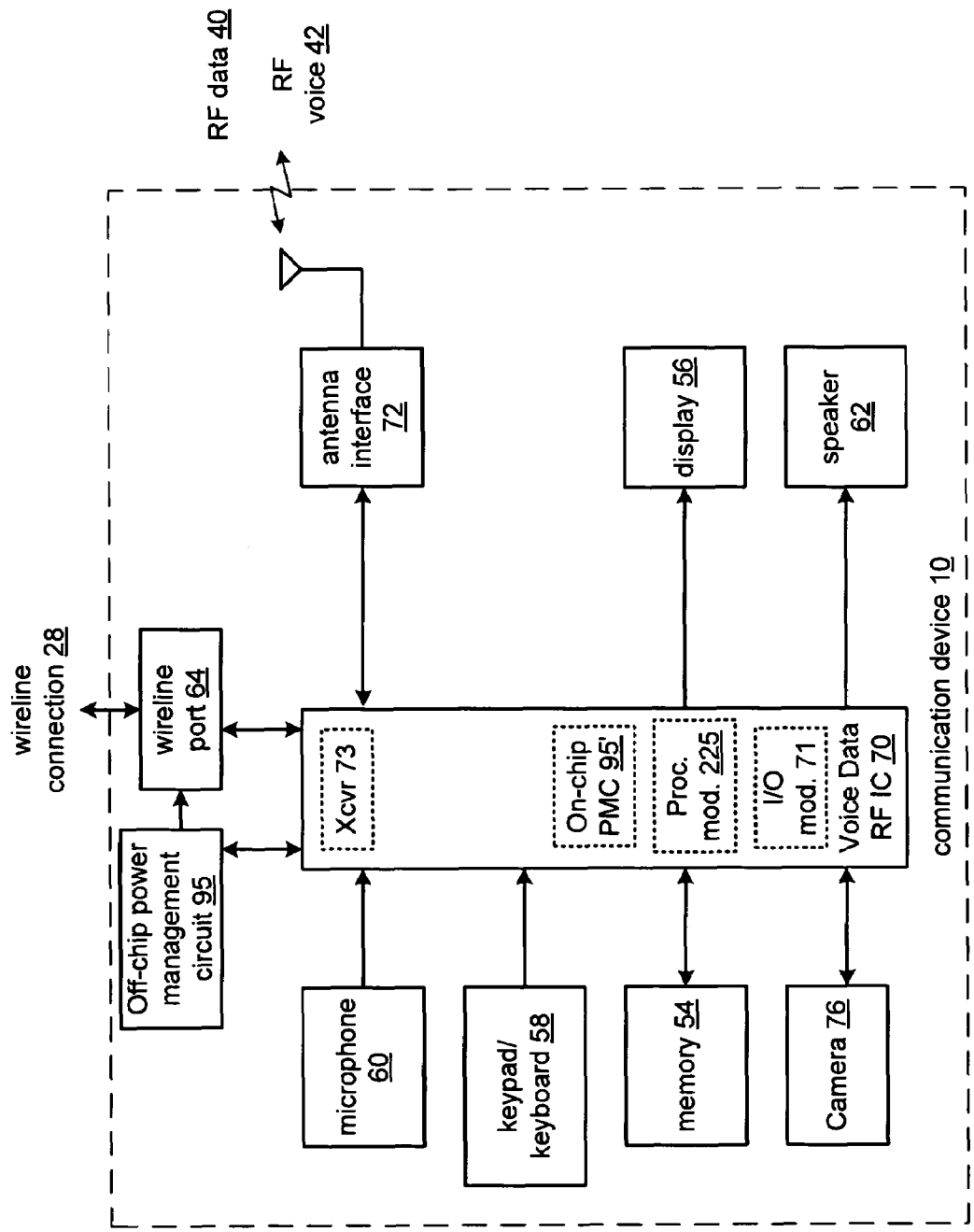
FIG. 3 is a schematic block diagram of an embodiment of an integrated circuit in accordance with the present invention.

FIG. 3 is a schematic block diagram of an embodiment of an integrated circuit in accordance with the present invention. In particular, a voice data RF integrated circuit (IC) 50 is shown that implements communication device 10 in conjunction with microphone 60, keypad/keyboard 58, memory 54, speaker 62, display 56, camera 76, antenna interface 52 and wireline port 64. In addition, voice data RF IC 50 includes a transceiver 73 with RF and baseband modules for formatting and modulating data and voice signals into RF real-time data 26 and non-real-time data 24 and transmitting this data via an antenna interface 72 and an antenna, and for receiving RF data and RF voice signals via the antenna. Further, voice data RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the voice data RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 50. Voice Data RF IC 50 optionally includes an on-chip power management circuit 95' for replacing the off-chip power management circuit 95.

In an embodiment of the present invention, the voice data RF IC 50 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the voice, data RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 50 executes operational instructions that implement one or more of the applications (real-time or non-real-time) attributed to communication devices 10 and 30 as discussed in conjunction with FIGS. 1 and 2. Further, RF IC 50 includes spectrum control and/or filtration features in accordance with the present invention that will be discussed in greater detail in association with FIG. 5-27.

Figure 4:
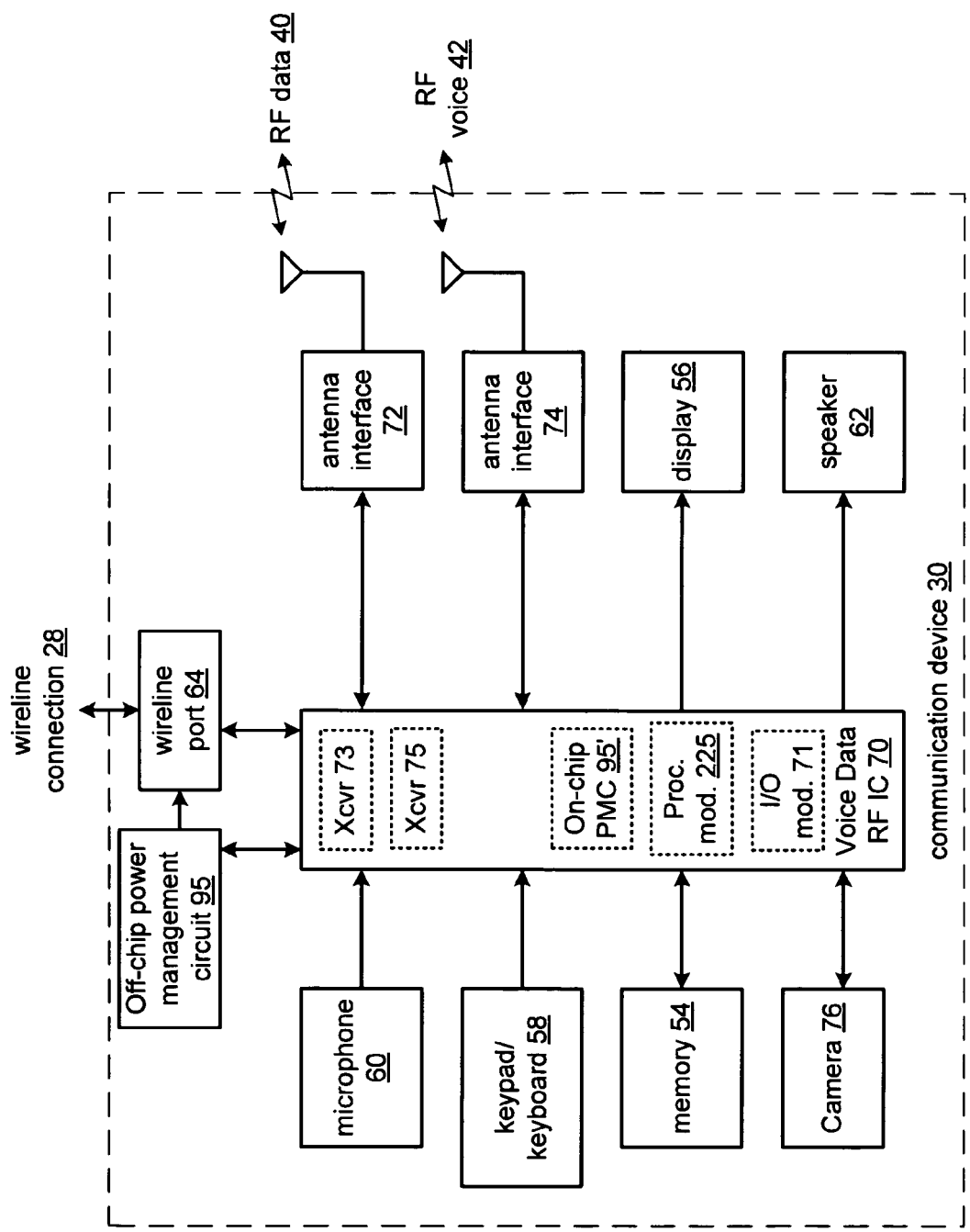
FIG. 4 is a schematic block diagram of another embodiment of an integrated circuit in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. Voice data RF IC 70 is similar to voice data RF IC 50 and is capable of any of the applications, functions and features attributed to voice data RF IC 50 as discussed in conjunction with FIG. 3. However, voice data RF IC 70 includes two separate wireless transceivers 73 and 75 for communicating, contemporaneously, via two or more wireless communication protocols via RF data 40 and RF voice signals 42.

In operation, the voice data RF IC 70 executes operational instructions that implement one or more of the applications (real-time or non-real-time) attributed to communication device 10 as discussed in conjunction with FIG. 1. Further, RF IC 70 includes spectrum control and/or filtration features in accordance with the present invention that will be discussed in greater detail in association with FIG. 5-27.

Figure 5:
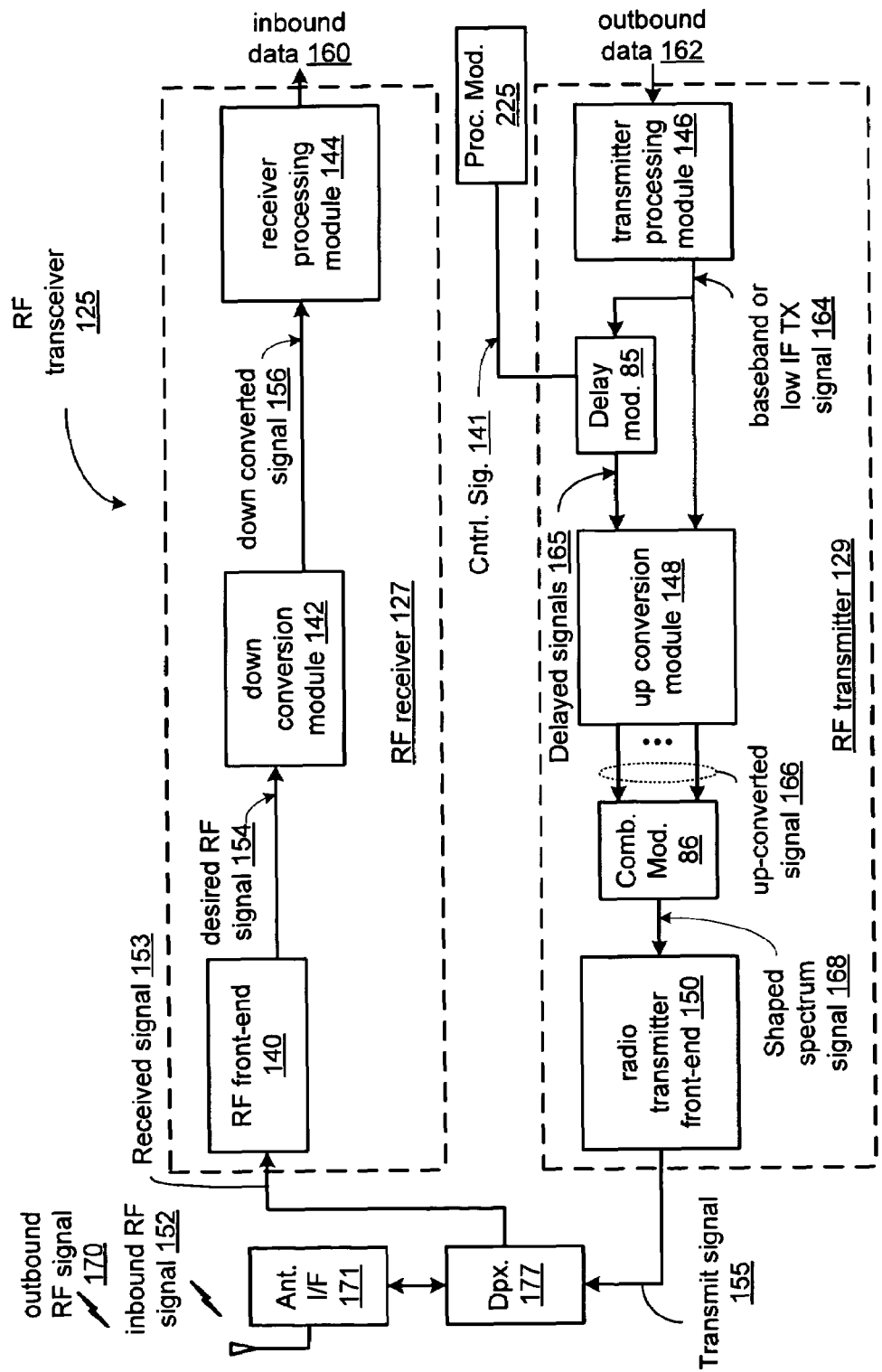
FIG. 5 is a schematic block diagram of an embodiment of an RF transceiver in accordance with the present invention.

FIG. 5 is a schematic block diagram of an RF transceiver 125, such as transceiver 73 or 75, which may be incorporated in communication devices 10 and/or 30. The RF transceiver 125 includes an RF transmitter 129, an RF receiver 127 coupled to the processing module 225. The RF receiver 127 includes an RF front end 140, a down conversion module 142, and a receiver processing module 144. The RF transmitter 129 includes a transmitter processing module 146, an up conversion module 148, a radio transmitter front-end 150, and a programmable delay module 85 and combining module 86 that operate to provide programmable spectrum control of the transmit signal 155.

As shown, the transmitter is coupled to an antenna through power amplifier module 180, off-chip antenna interface 171 and a diplexer (duplexer) 177, that couples the transmit signal 155 to the antenna to produce outbound RF signal 170 and couples inbound RF signal 152 to produce received signal 153. While a diplexer is shown, a transmit/receive switch could likewise be employed for the same purpose. While a single antenna is represented, the receiver and transmitter may each employ separate antennas or share a multiple antenna structure that includes two or more antennas. In another embodiment, the receiver and transmitter may share a multiple input multiple output (MIMO) antenna structure that includes a plurality of antennas. Each antenna may be fixed, programmable, an antenna array or other antenna configuration. Accordingly, the antenna structure of the wireless transceiver could also depend on the particular standard(s) to which the wireless transceiver is compliant and the applications thereof.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce a processed signal such as baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz.

Note that the processing performed by the transmitter processing module 146 can include, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Programmable delay module 85 generates a plurality of delayed signals 165 from the baseband or low IF TX signals 164, wherein each delayed signal is scaled based on one of a plurality of coefficients, wherein the plurality of coefficients are selected based on a control signal 141.

The up conversion module 148 can include a digital-to-analog conversion (DAC) module, a filtering and/or gain module, and an up-conversion section. The DAC module converts the baseband or low IF TX signals 164 from the digital domain to the analog domain. The filtering and/or gain module filters and/or adjusts the gain of the analog signals prior to providing it to an up-conversion section. The up-conversion section converts the analog baseband or low IF signals into up converted signals 166 based on a transmitter local oscillation 168. As discussed above, the up conversion module 148 phase, frequency or amplitude modulates an RF carrier frequency based on the processed signal, such as baseband or low IF transmit signal 164 and the plurality of delayed signals to generate a plurality of up-converted signals 166. In an embodiment of the present invention a mixer, phase locked loop circuit or other phase/frequency modulator is used for this purpose. Up conversion module 166 optionally includes a limiter circuit for leveling the amplitude of its output signal.

Combining module 86 combines the plurality of up-converted signals to generate a shaped-spectrum signal 168 via summing, subtraction or other linear combination. The radio transmitter front end 150 amplifies the shaped spectrum signal to produce transmit signal 155 and ultimately outbound RF signal 170, which may be filtered by a transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional low-pass, bandpass and/or notch filtration.

In operation, the scaling of the plurality delayed baseband or low IF transmit signals is controlled by processing module 225. When the up-converted and scaled delayed signals 165 are combined by addition or subtraction with the up-converted baseband or low-IF transmit signal 164, the result is a shaped spectrum signal 168 that is, in effect, a finite impulse response (FIR) filtered RF signal. By controlling the scaling of the delayed signals 165 and/or the number of delayed signals 165 via control signal 141, the processing module 225 can control one or more spectrum parameters such as the order of filtration, filter types and other roll-off parameters, filter cut-off frequencies. These filter parameters, when taken in combination with any optionally filtration or other spectral characteristics of the radio transmitter front-end 150 can be used to control the spectral parameters of the transmit signal 155 such as the center frequency, bandwidth, upper cut-off frequency, lower cut-off frequency, etc.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass and/or notch filtration of the inbound RF signal 152.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 6:
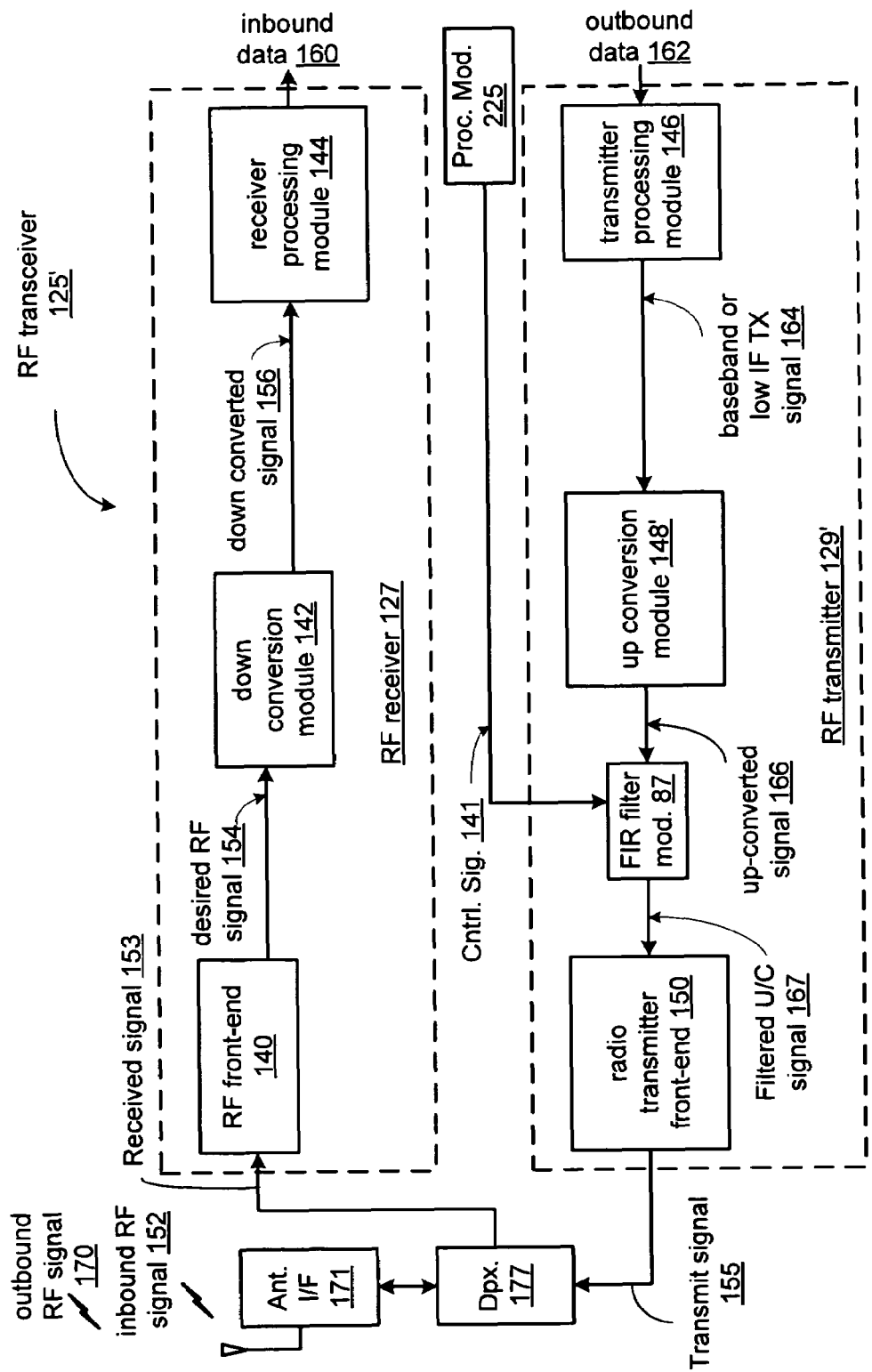
FIG. 6 is a schematic block diagram of another embodiment of an RF transceiver in accordance with the present invention.

FIG. 6 is a schematic block diagram of another embodiment of an RF transceiver in accordance with the present invention. In particular, an RF transceiver 125' is presented that includes many similar elements described in conjunction with FIG. 5 that are referred to by common reference numerals. In this embodiment, up-conversion module 148' simply generates an up-converted signal 166 based on the baseband or low IF signal 164. A programmable filter module, such as FIR filter module 87, generates and scales a plurality of delayed signals from the up-converted signal 166 based on a plurality of coefficients and generates a filtered up-converted signal 167 by combining the up-converted signal 166 and the plurality of delayed signals. The plurality of coefficients are selected based on a control signal 141 generated by processing module 225 to attenuate at least one RF spur of the up-converted signal 167. Radio transmitter front-end 150 generates transmit signal 155 based on the filtered up-converted signal 167 in a similar fashion to radio transmitter front-end 150 of FIG. 5.

In operation, the processing module 225 generates one or more control signals 141 to control the order of the FIR filter of FIR filter module 87 by controlling the number of delayed signals that are generated. In an embodiment of the present invention, the control signal 141 is generated to select coefficients corresponding to a notch filter configuration having a notch frequency that coincides with the RF spur to be attenuated. Control signal 141 can optionally control additional filter parameters of the FIR filter module 87 such as the depth of the notch, the filter quality, the filter type and/or other filter parameters based on the number of delayed signals and the particular values of the coefficients.

Figure 7:
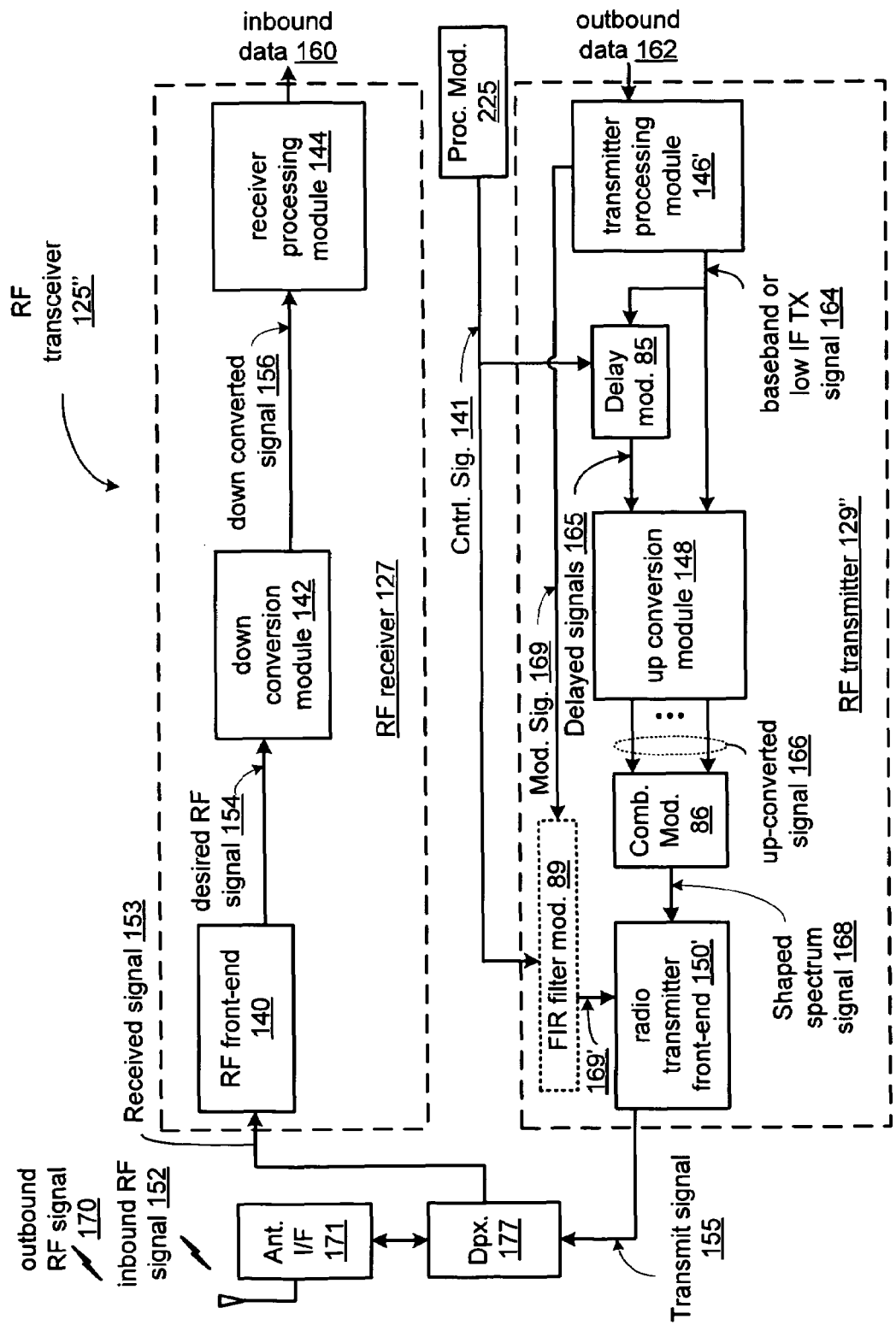
FIG. 7 is a schematic block diagram of another embodiment of an RF transceiver in accordance with the present invention.

FIG. 7 is a schematic block diagram of another embodiment of an RF transceiver in accordance with the present invention. In particular, an RF transceiver 125" is presented that includes many similar elements described in conjunction with FIG. 5 that are referred to by common reference numerals. In this configuration however, the RF transmitter 129" produces a transmit signal 155 that includes a polar coordinate transmission having a carrier wave that is amplitude modulated and phase modulated by separate modulation signals. Transmitter processing module 146' converts outbound data 162 into separate amplitude and phase data. For example, transmitter processing module 146' can generate processed data such as the baseband or low IF transmit signal 164 with phase modulation and a modulating signal 169 for amplitude modulation. In this configuration, delay module 85, up-conversion module 148 and combining module 86 operate to generate shaped spectrum signal 168 that is phase modulated based on baseband or low IF signal 164.

Modulating signal 169 is optionally filtered by a programmable filer such as FIR filter module 89 to generate a filtered modulating signal 169'. Radio transmitter front-end 150' includes a polar amplifier that amplifies and amplitude modulates the shaped spectrum signal 168 by the modulating signal 169 or filtered modulating signal 169'. As in the embodiment of FIG. 5, processing module 225 can control the spectral parameters of shaped spectrum signal 168, and thus, the spectral parameters of transmit signal 155 based on the control of programmable delay module 85.

When included, FIR filter module 89 generates and scales a plurality of delayed signals from the modulating signal 169 based on a plurality of coefficients that are selected based on the control signal 141. FIR filter module 89 generates the filtered modulating signal 169' by combining the modulating signal 169 and the plurality of delayed signals. Control signal 141 can select the coefficients and number of delayed signal to control the order of the filter, the filter type, one or more cut-off frequencies and other filter parameters to further control the shape of the spectrum of the transmit signal 155.

Figure 8:
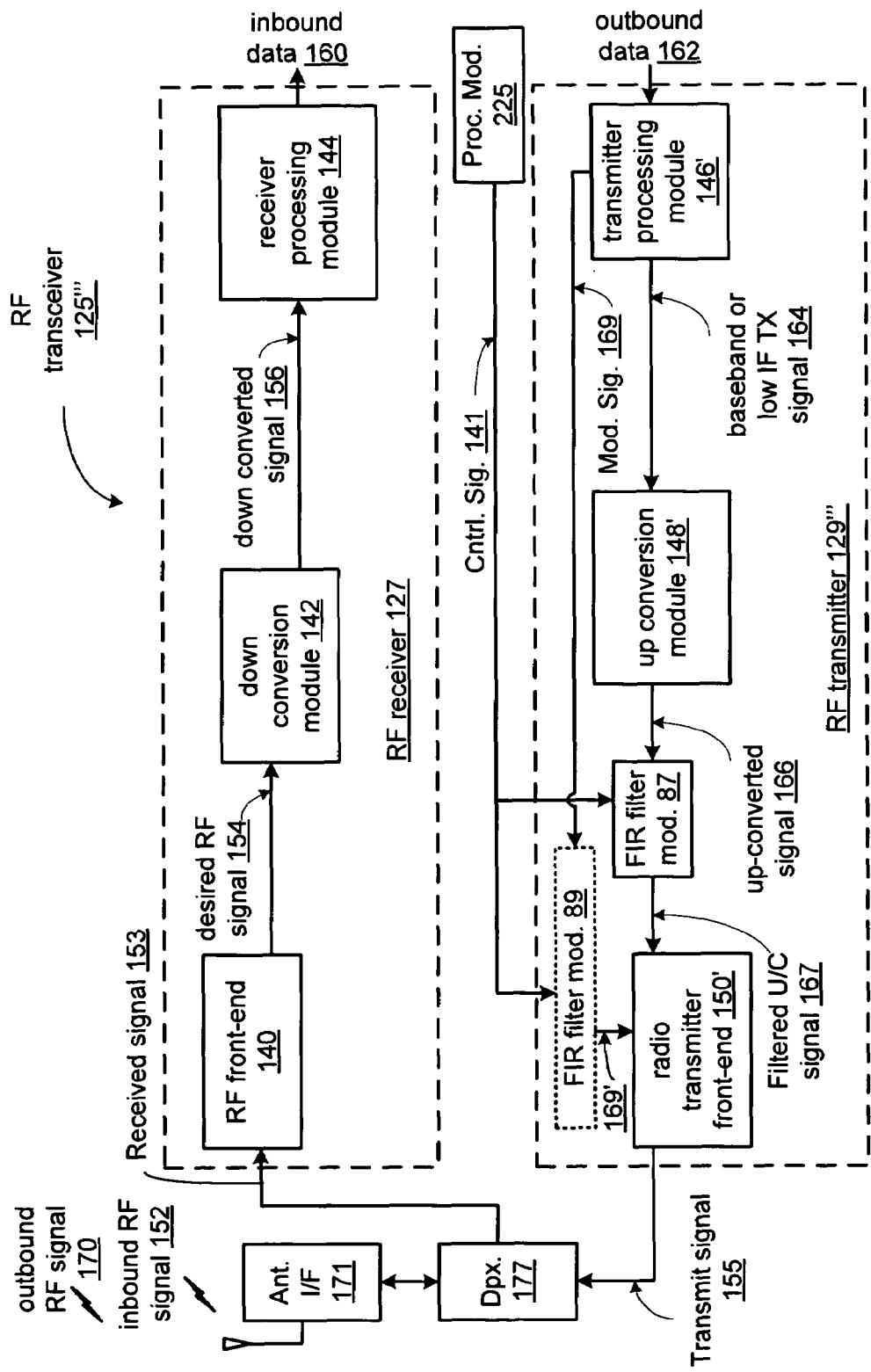
FIG. 8 is a schematic block diagram of another embodiment of an RF transceiver in accordance with the present invention.

FIG. 8 is a schematic block diagram of another embodiment of an RF transceiver in accordance with the present invention. In particular, an RF transceiver 125" is presented that includes many similar elements described in conjunction with FIGS. 5, 6 and 7 that are referred to by common reference numerals. In this configuration however, the RF transmitter 129'" produces a transmit signal 155 that includes a polar coordinate transmission having a carrier wave that is amplitude modulated and phase modulated by separate modulation signals. In this configuration, up-conversion module 148' and FIR filter module 87 operate to generate filtered up-converted signal 167 that is phase modulated based on baseband or low IF signal 164. Radio transmitter front-end 150' includes a polar amplifier that amplifies and amplitude modulates the filtered up-converted signal 167 by the modulating signal 169 or filtered modulating signal 169'.

Figure 9:
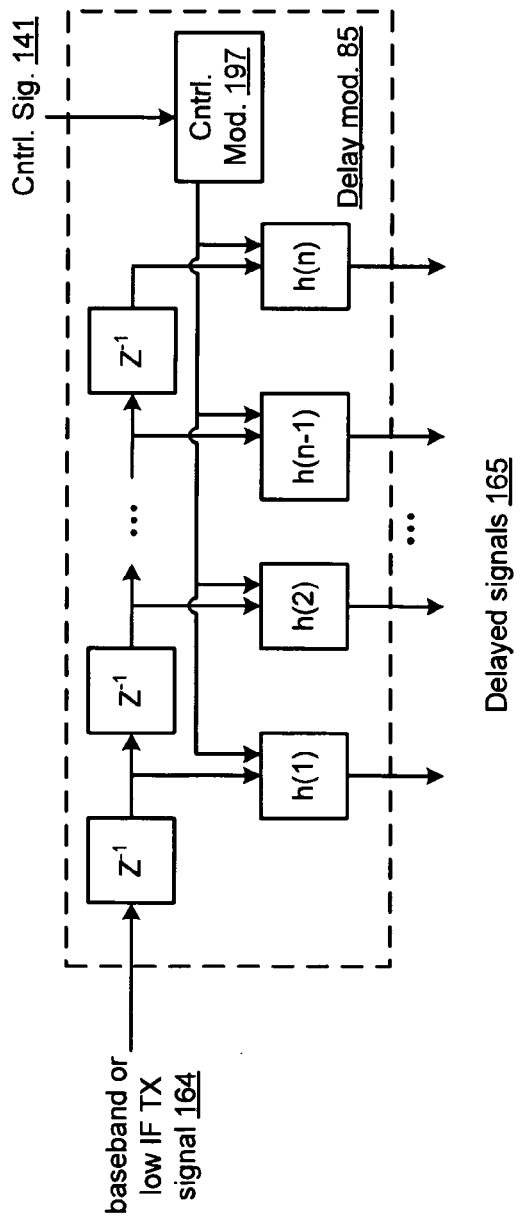
FIG. 9 is a schematic block diagram of an embodiment of a delay module in accordance with the present invention.

FIG. 9 is a schematic block diagram of an embodiment of a delay module in accordance with the present invention. In particular a programmable delay module 85 is presented that includes n delay elements represented by their Z-transform representation of $Z^{-1}$. The delayed signals 165 are generated by scaling the first delayed signal by a coefficient $h(1)$, a second delayed signal by a coefficient $h(2)$, etc. As shown with optional control module 197, the particular coefficients $h(i)$ are set by control module 197 in response to control signal 141. In an alternative configuration, control module 197 can be omitted when control signal 141 includes the particular coefficients $h(i)$. It should be noted that the one or more of the coefficients $h(i)$ can be zero or substantially zero. The order of the filter can be reduced, and thus the number of delayed signals can be reduced by setting the higher-order coefficients equal to zero, however, other coefficients can be zero or substantially zero based on the particular filter that is implemented. In an alternative configuration the value of n can be set by the control signal 141.

As discussed in conjunction with FIG. 5, the delay module 85 and the combining module 86 operate to form a programmable RF FIR filter. In operation, processing module 225 includes a look-up table, algorithm, application or utility that controls the selection of the coefficients $h(i)$ either directly or through control module 197 to generate a filter configuration corresponding to the desired spectral parameters of shaped spectrum signal 168 and/or transmit signal 155.

Delay module 85 can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the delay module 85 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 10:
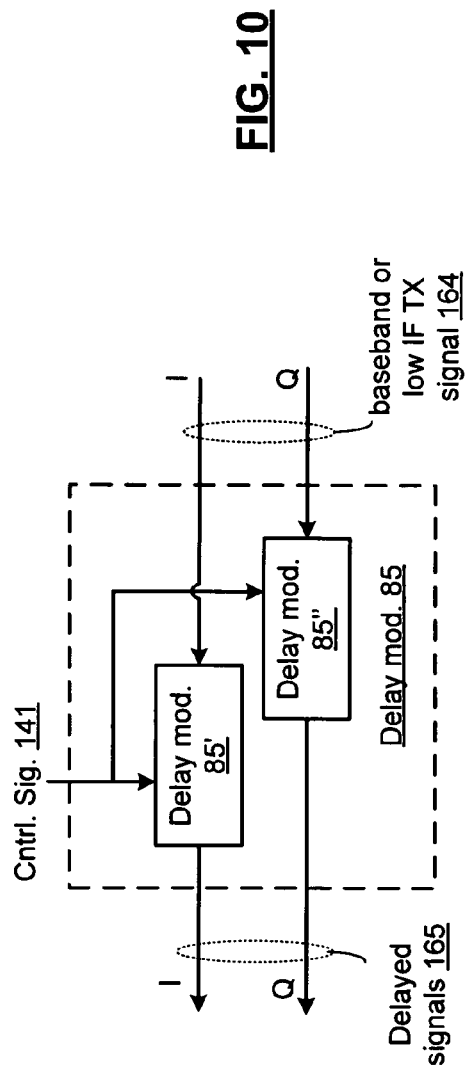
FIG. 10 is a schematic block diagram of another embodiment of a delay module in accordance with the present invention.

FIG. 10 is a schematic block diagram of another embodiment of a delay module in accordance with the present invention. In this embodiment, the baseband or low IF signal 164 is a mixed signal with in-phase (I) and quadrature-phase (Q) components. In this configuration, delay module 85 includes delay module 85' that generates in-phase delayed signals and delay module 85" that generates quadrature-phase delayed signals. Up-conversion module 148 further operates on a mixed-signal basis to generate up-converted signals 166.

FIGS. 11 and 12 are schematic block diagrams of delay modules 85' and 85" in accordance with an embodiment of the present invention. In particular, delay modules 85' and 85" operate in a similar fashion to delay module 85 presented in conjunction with FIG. 9 to generate I-phase delayed signals 165' and Q-phase delayed signals 165" based on, respectively, I-Phase baseband or low IF signal 164' and Q-Phase baseband or low IF signal 164".

Figure 13:
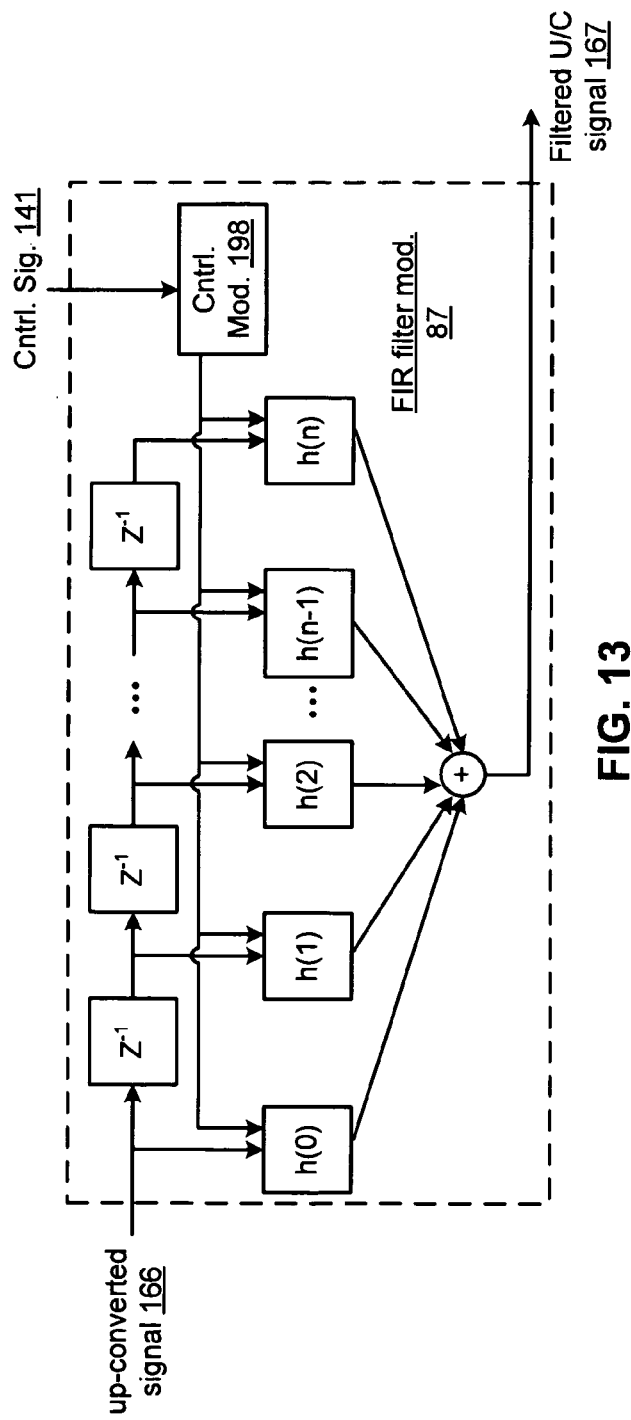
FIG. 13 is a schematic block diagram of an embodiment of a filter module in accordance with the present invention.

FIG. 13 is a schematic block diagram of an embodiment of a filter module in accordance with the present invention. In particular a programmable FIR filter module 87 is presented that includes n delay elements represented by their Z-transform representation of $Z^{-1}$. The filtered up-converted signal 167 is generated by scaling the first delayed signal by a coefficient h(1), a second delayed signal by a coefficient h(2), etc. As shown with optional control module 198, the particular coefficients h(i) are set by control module 198 in response to control signal 141. In an alternative configuration, control module 198 can be omitted when control signal 141 includes the particular coefficients h(i). It should be noted that the one or more of the coefficients h(i) can be zero or substantially zero. The order of the filter can be reduced, and thus the number of delayed signals can be reduced by setting the higher-order coefficients equal to zero, however, other coefficients can be zero or substantially zero based on the particular filter that is implemented. In an alternative configuration the value of n can be set by the control signal 141.

In operation, processing module 225 includes a look-up table, algorithm, application or utility that controls the selection of the coefficients h(i) either directly or through control module 198 to generate a filter configuration corresponding to the desired spectral parameters of up-converted signal 167 and/or transmit signal 155. Such control can include generating a notch filter having a controllable depth, quality and notch frequency to attenuate an undesirable RF spur.

FIR filter module 87 can be implemented using a shared processing device, individual processing devices, or a plurality of processing devices and may further include memory. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the FIR filter module 87 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 14:
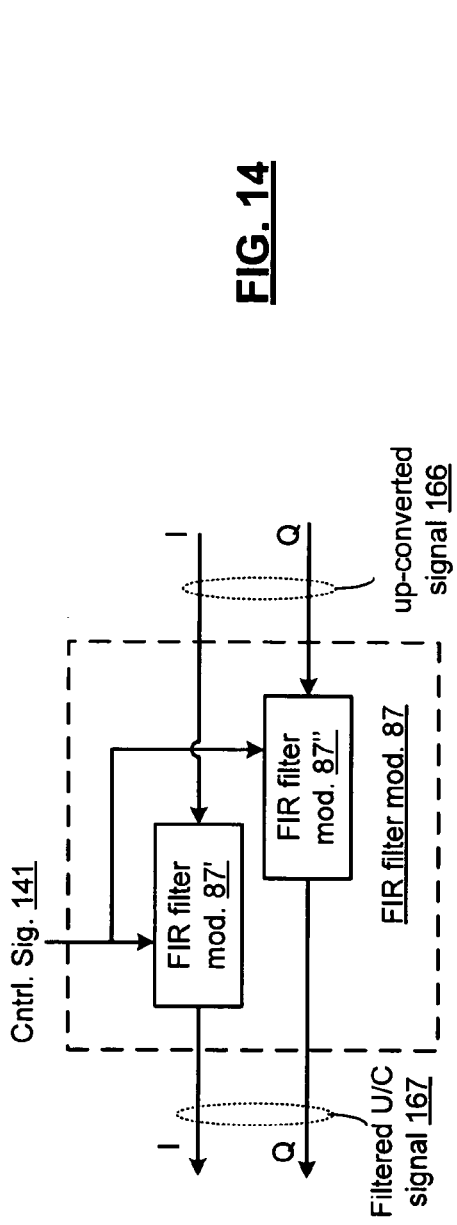
FIG. 14 is a schematic block diagram of another embodiment of a filter module in accordance with the present invention.

FIG. 14 is a schematic block diagram of another embodiment of a filter module in accordance with the present invention. In this embodiment, the up-converted signal 166 is a mixed signal with in-phase (I) and quadrature-phase (Q) components. In this configuration, FIR filter module 87 includes FIR filter module 87' that generates in-phase filtered up-converted signals and FIR filter module 87" that generates quadrature-phase up-converted signals.

Figure 15:
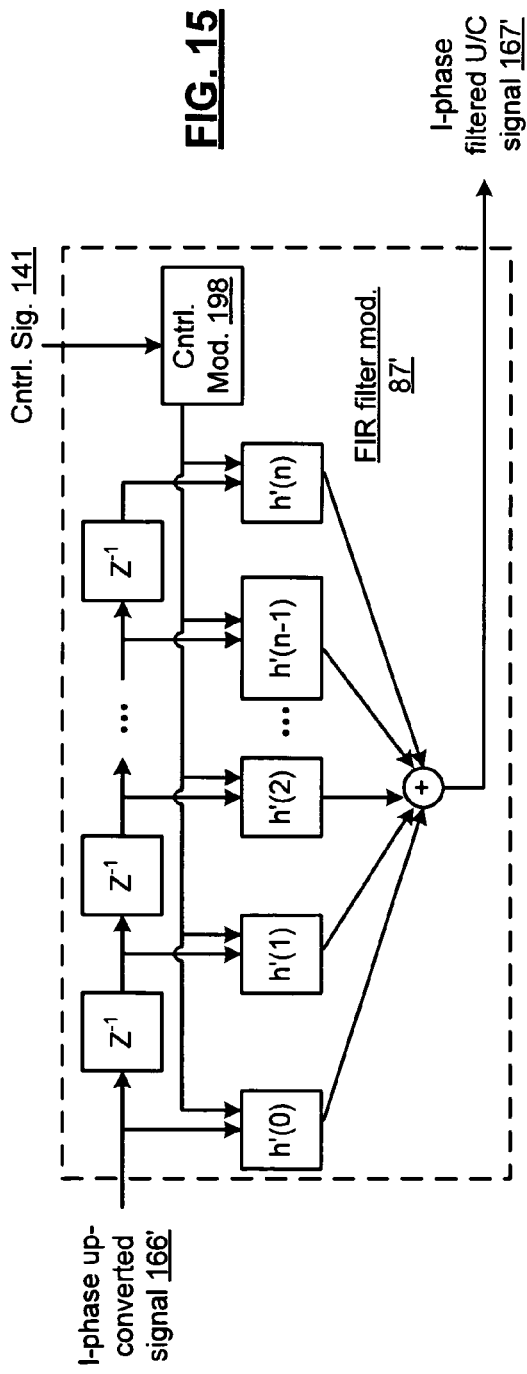
FIG. 15 is a schematic block diagram of another embodiment of a filter module in accordance with the present invention.
Figure 16:
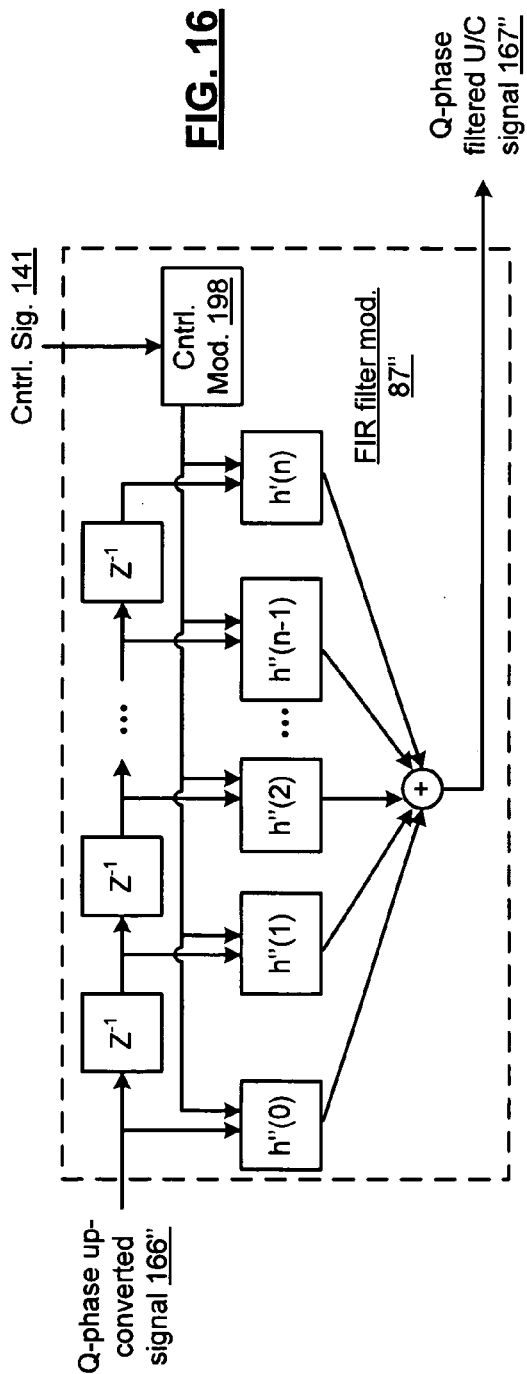
FIG. 16 is a schematic block diagram of another embodiment of a filter module in accordance with the present invention.

FIGS. 15 and 16 are schematic block diagrams of FIR filter modules 87' and 87" in accordance with an embodiment of the present invention. In particular, FIR filter modules 87' and 87" operate in a similar fashion to FIR filter module 87 presented in conjunction with FIG. 13 to generate I-phase filtered up-converted signals 167' and Q-phase filtered up-converted signals 167" based on, respectively, I-Phase up-converted signal 166' and Q-Phase up-converted signal 166".

FIG. 17 is a schematic block diagram of another embodiment of a filter module in accordance with the present invention. In particular a programmable FIR filter module 89 is presented that includes n delay elements represented by their Z-transform representation of $Z^{-1}$. The filtered modulating signal 169' is generated based on modulating signal 168 and n delayed versions of modulating signal 169. The modulating signal 169 is scaled by a coefficient h(0), the first delayed signal is scaled by a coefficient h(1), the second delayed signal is scaled by a coefficient h(2), etc. As shown with optional control module 199, the particular coefficients h(i) are set by control module 199 in response to control signal 141. In an alternative configuration, control module 199 can be omitted when control signal 141 includes the particular coefficients h(i). It should be noted that the one or more of the coefficients h(i) can be zero or substantially zero. The order of the filter can be reduced, and thus the number of delayed signals can be reduced by setting the higher-order coefficients equal to zero, however, other coefficients can be zero or substantially zero based on the particular filter that is implemented. In an alternative configuration the value of n can be set by the control signal 141.

In operation, processing module 225 includes a look-up table, algorithm, application or utility that controls the selection of the coefficients h(i) either directly or through control module 199 to generate a filter configuration corresponding to the desired spectral parameters of filtered modulating signal 169' and/or transmit signal 155.

FIR filter module 89 can be implemented using a shared processing device, individual processing devices, or a plurality of processing devices and may further include memory. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the FIR filter module 89 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

FIG. 18 is a schematic block diagram of an embodiment of a radio transmitter front-end in accordance with the present invention. In this embodiment, radio transmitter front-end 150 is implemented with a polar amplifier 190 that generates transmit signal 155 by amplifying and amplitude modulating shaped spectrum signal 168 based on either modulating signal 169 or filtered modulating signal 169'. Polar amplifier 190 can include one or more stages including optional preamplifiers, power amplifiers or drivers along with at least one stage that amplitude modulates the signal by the modulating signal 169 or filtered modulating signal 169' via mixing, multiplying, squaring, etc.

FIG. 19 is a schematic block diagram of another embodiment of a radio transmitter front-end in accordance with the present invention. In this embodiment, radio transmitter front-end 150 is implemented with a polar amplifier 190 that generates transmit signal 155 by amplifying and amplitude modulating filtered up-converted signal 167 based on either modulating signal 169 or filtered modulating signal 169'. As discussed in conjunction with FIG. 18, Polar amplifier 190 can include one or more stages including optional preamplifiers, power amplifiers or drivers along with at least one stage that amplitude modulates the signal by the modulating signal 169 or filtered modulating signal 169' via mixing, multiplying, squaring, etc.

Figure 20:
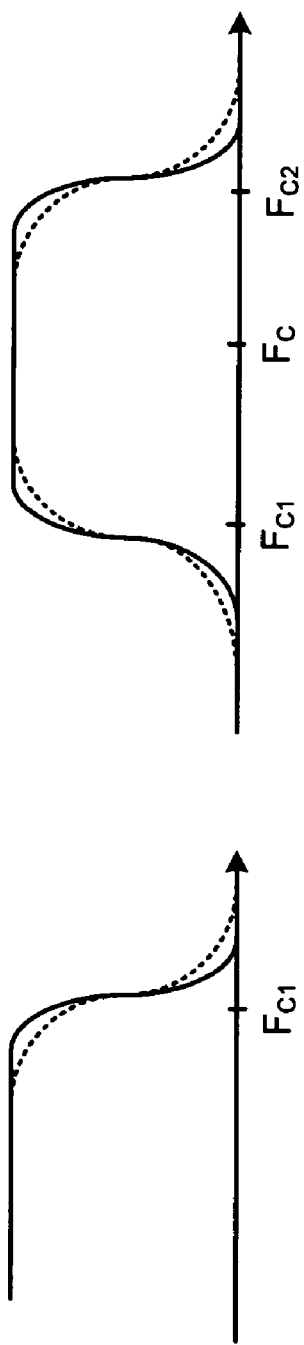
FIG. 20 is a graphical representation of a frequency spectrum in accordance with an embodiment of the present invention.

FIG. 20 is a graphical representation of a frequency spectrum in accordance with an embodiment of the present invention. In particular, alternative spectral shapes are shown for a lowpass filter and a bandpass filter with varying filter roll-off that can be implemented with FIR filter 89 and the FIR filtering implemented by the delay module 85 in conjunction with combining module 86. As will be understood by one skilled in the art when presented the disclosure herein, the cut-off frequencies $F_{c1}$ and/or $F_{c2}$, the center frequency $F_c$, the bandwidth, gain, filter type, filter order and roll-off can each be controlled based on the number of delay elements employed and the selection of coefficients h(i), h'(i), and h"(i).

Figure 21:
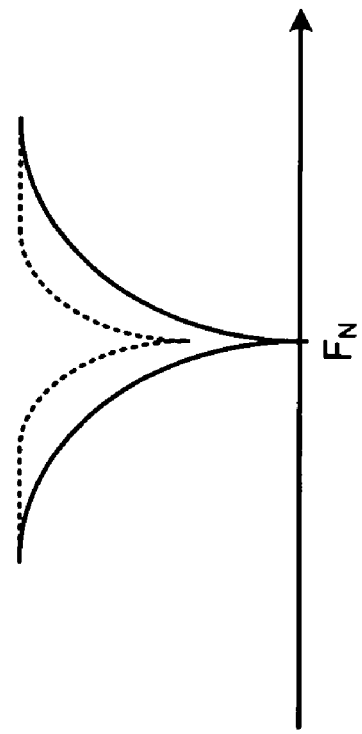
FIG. 21 is a graphical representation of another frequency spectrum in accordance with an embodiment of the present invention.

FIG. 21 is a graphical representation of another frequency spectrum in accordance with an embodiment of the present invention. In particular, alternative spectrum shapes of a notch filter that can be implemented by FIR filter module 87 is shown. As will be understood by one skilled in the art when presented the disclosure herein, the notch frequencies $F_n$, the quality, notch depth, filter type, and filter order can each be controlled based on the number of delay elements employed and the selection of coefficients h(i), h'(i), and h"(i).

Figure 22:
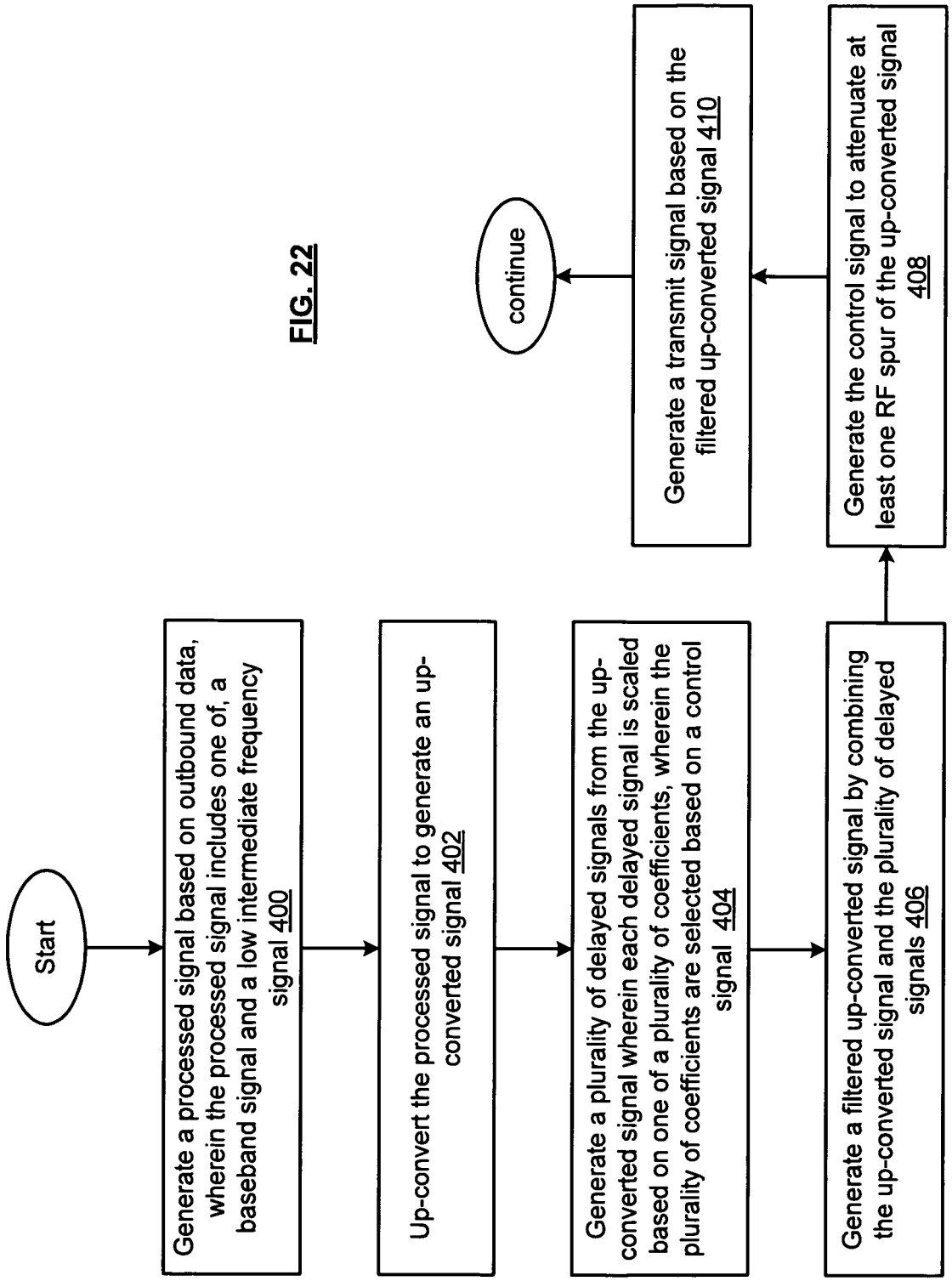
FIG. 22 is a flow chart of an embodiment of a method in accordance with the present invention.

FIG. 22 is a flow chart of an embodiment of a method in accordance with the present invention. In particular, a method is presented for use in conjunction with one or more of the functions and features described in conjunction with FIGS. 1-21. In step 400, a processed signal is generated based on outbound data, wherein the processed signal includes one of: a baseband signal and a low intermediate frequency signal. In step 402, the processed signal is up-converted to generate an up-converted signal. In step 404, a plurality of delayed signals are generated from the up-converted signal wherein a delayed signal of the plurality of delayed signals is scaled based on one of a plurality of coefficients, wherein the plurality of coefficients are selected based on a control signal. In step 406, a filtered up-converted signal is generated by combining the up-converted signal and the plurality of delayed signals. In step 408, the control signal is generated to attenuate at least RF spur of the up-converted signal. In step 410, a transmit signal is generated based on the filtered up-converted signal.

In an embodiment of the present invention, step 406 generates a finite impulse response filtered up-converted signal such as a notch filtered up-converted signal having a programmable notch frequency. Step 404 can include adjusting a number of the plurality of delayed signals based on the control signal, selecting the plurality of coefficients based on the control signal. The control signal can include selected values of the plurality of coefficients. The up-converted signal can include an in-phase component and a quadrature-phase component and wherein the plurality of delayed signals includes a plurality of in-phase delayed signals and a plurality of quadrature-phase delayed signals.

Figure 23:
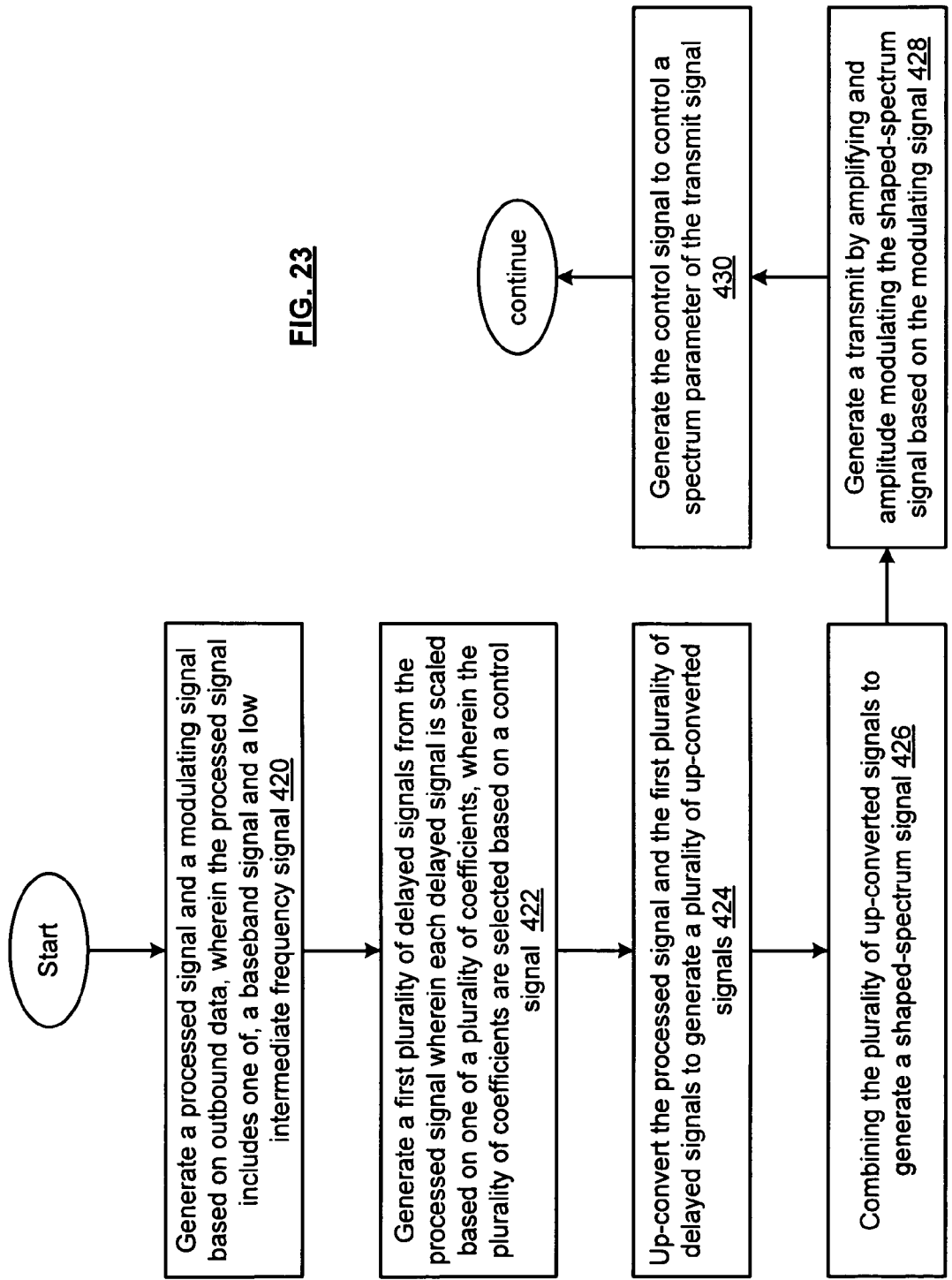
FIG. 23 is a flow chart of an embodiment of a method in accordance with the present invention.

FIG. 23 is a flow chart of an embodiment of a method in accordance with the present invention. In particular, a method is presented for use in conjunction with one or more of the functions and features described in conjunction with FIGS. 1-22. In step 420, a processed signal and a modulating signal are generated based on outbound data, wherein the processed signal includes one of: a baseband signal and a low intermediate frequency signal. In step 422, a first plurality of delayed signals is generated from the processed signal, wherein a delayed signal of the first plurality of delayed signals is scaled based on one of a first plurality of coefficients, wherein the first plurality of coefficients are selected based on a control signal. In step 424, the processed signal and the first plurality of delayed signals are up-converted to generate a plurality of up-converted signals. In step 426, the plurality of up-converted signals are combined to generate a shaped-spectrum signal. In step 428, a transmit signal is generated by amplifying and amplitude modulating the shaped-spectrum signal based on the modulating signal. In step 430, the control signal is generated to control a spectrum parameter of the transmit signal.

The spectrum parameter can includes a bandwidth, a center frequency, an upper cut-off frequency and/or a lower cut-off frequency. Step 422 can include adjusting a number of the first plurality of delayed signals based on the control signal, selecting the first plurality of coefficients based on the control signal. The control signal can include selected values of the first plurality of coefficients. The processed signal can include an in-phase component and a quadrature-phase component and wherein the first plurality of delayed signals includes a plurality of in-phase delayed signals and a plurality of quadrature-phase delayed signals.

Figure 24:
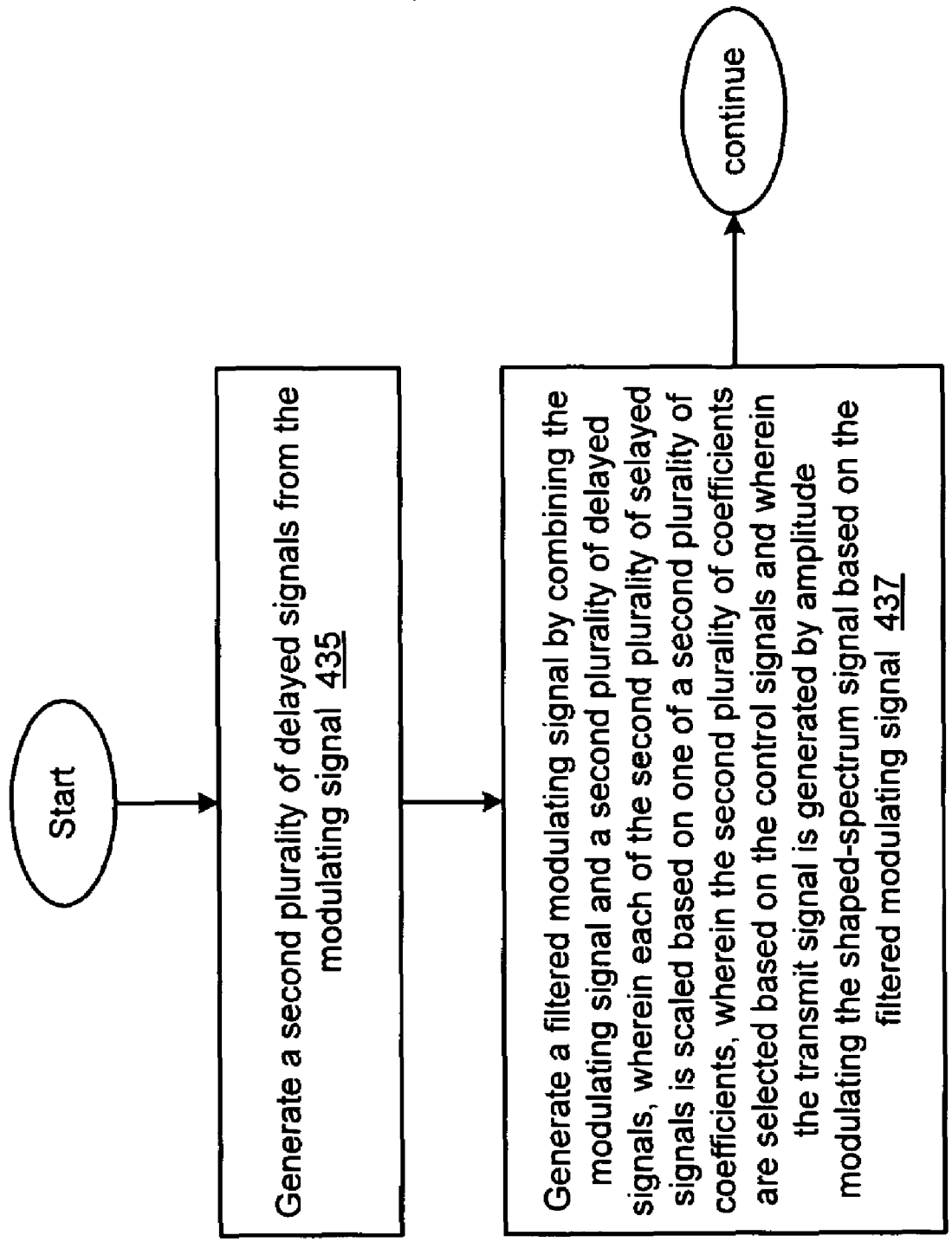
FIG. 24 is a flow chart of an embodiment of a method in accordance with the present invention.

FIG. 24 is a flow chart of an embodiment of a method in accordance with the present invention. In particular, a method is presented for use in conjunction with the method of FIG. 23. In step 435, a second plurality of delayed signals is generated from the modulating signal. In step 437, a filtered modulating signal is generated by combining the modulating signal and the second plurality of delayed signals, wherein each of the second plurality of delayed signals is scaled based on one of a second plurality of coefficients, wherein the second plurality of coefficients are selected based on the control signal, and wherein the transmit signal is generated in step 428 by amplitude modulating the shaped-spectrum signal based on the filtered modulating signal.

Figure 25:
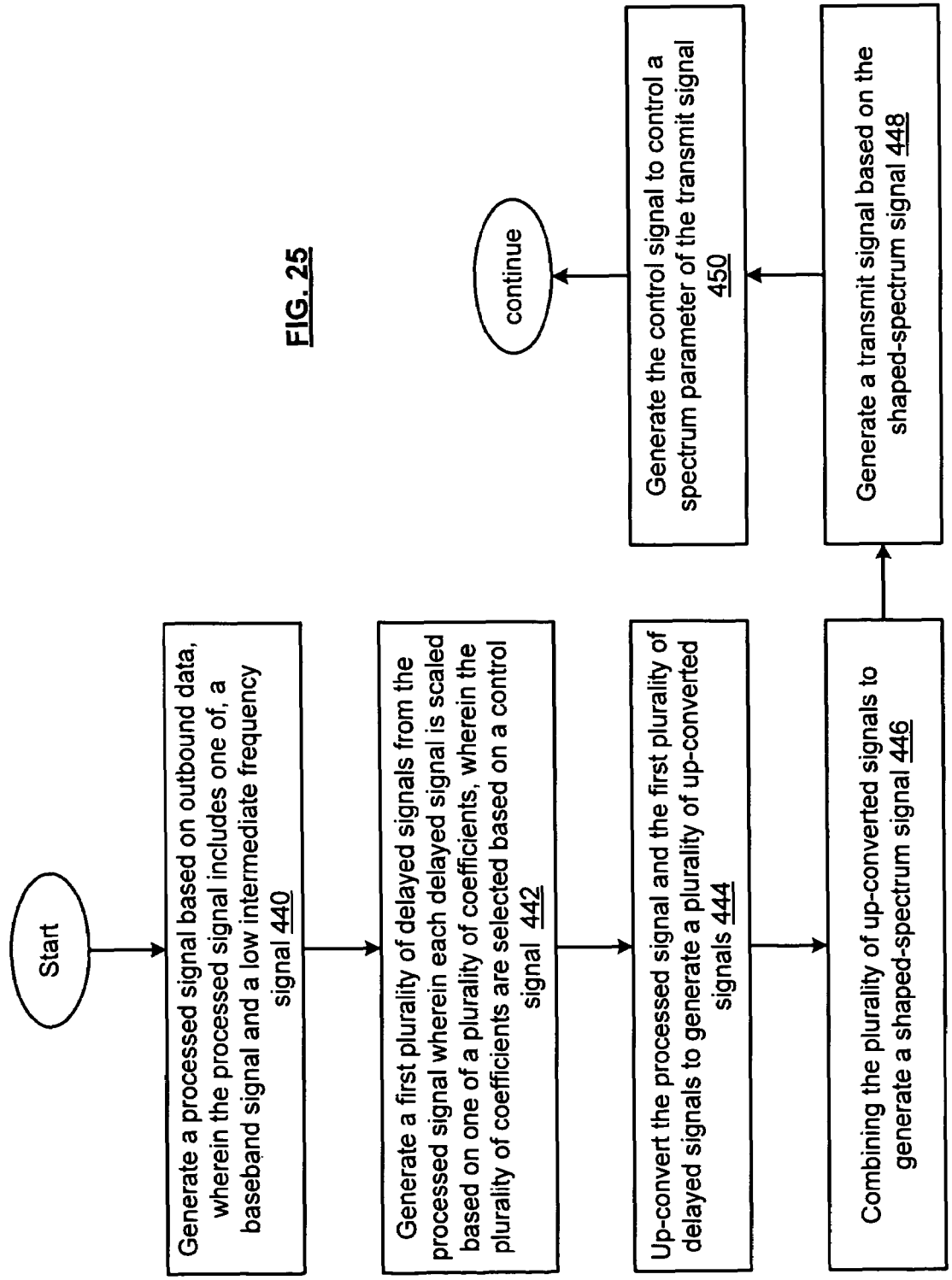
FIG. 25 is a flow chart of an embodiment of a method in accordance with the present invention.

FIG. 25 is a flow chart of an embodiment of a method in accordance with the present invention. In particular, a method is presented for use in conjunction with one or more of the functions and features described in conjunction with FIGS. 1-24. In step 440, a processed signal is generated based on outbound data, wherein the processed signal includes one of: a baseband signal and a low intermediate frequency signal. In step 442, a plurality of delayed signals are generated from the processed signal, wherein each delayed signal is scaled based on one of a plurality of coefficients, wherein the plurality of coefficients are selected based on a control signal. In step 444, the processed signal and the plurality of delayed signals are up-converted to generate a plurality of up-converted signals. In step 446, the plurality of up-converted signals is combined to generate a shaped-spectrum signal. In step 448, a transmit signal is generated based on the shaped-spectrum signal. In step 450, the control signal is generated to control a spectrum parameter of the transmit signal.

The spectrum parameter can include a bandwidth, a center frequency, an upper cut-off frequency and/or a lower cut-off frequency. Step 442 can include adjusting a number of the plurality of delays based on the control signal and/or selecting the plurality of coefficients based on the control signal. The control signal can include selected values of the plurality of coefficients. The processed signal can include an in-phase component and a quadrature-phase component and wherein the plurality of delayed signals includes a plurality of in-phase delayed signals and a plurality of quadrature-phase delayed signals.

Figure 26:
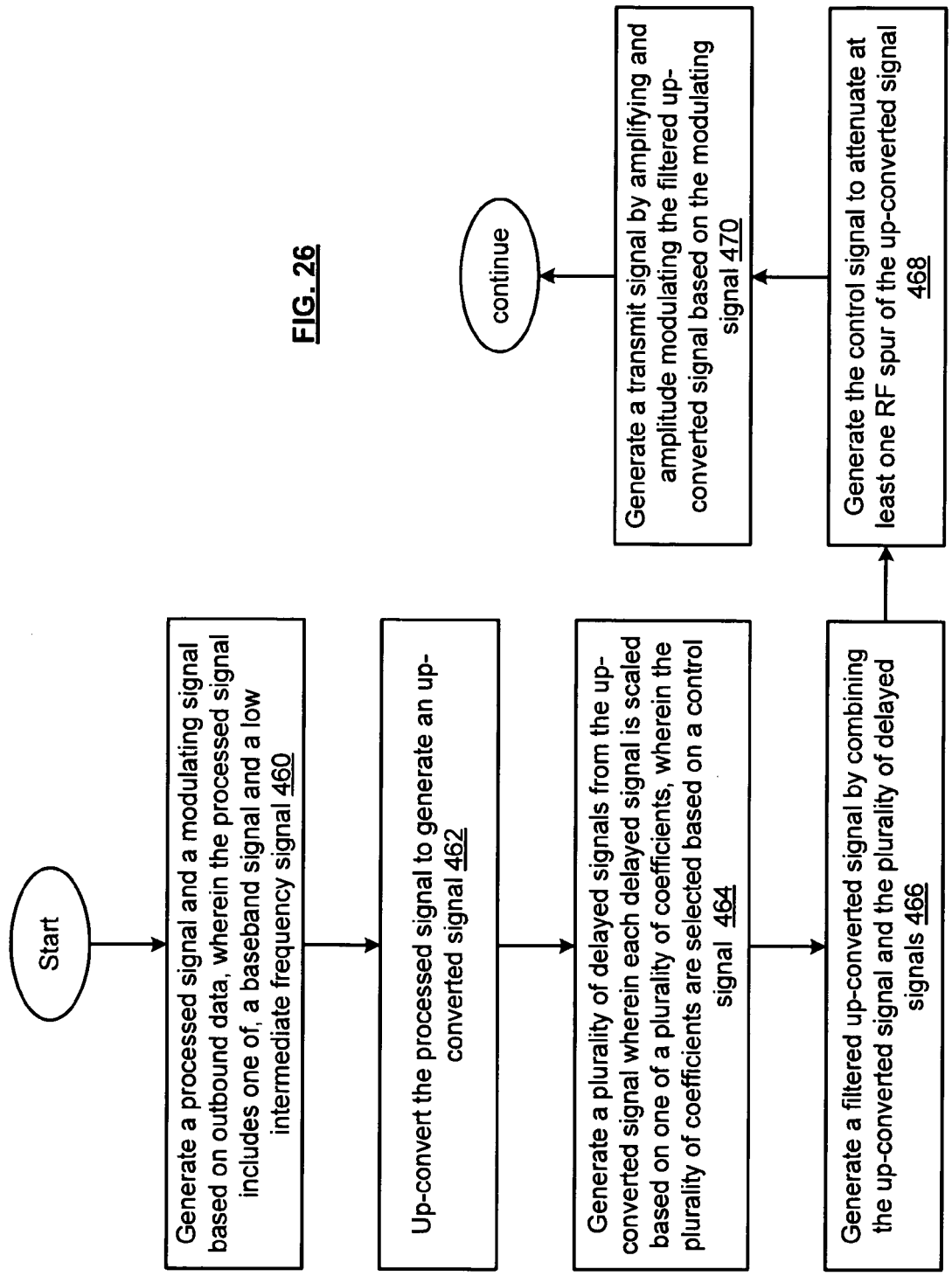
FIG. 26 is a flow chart of an embodiment of a method in accordance with the present invention.

FIG. 26 is a flow chart of an embodiment of a method in accordance with the present invention. In particular, a method is presented for use in conjunction with one or more of the functions and features described in conjunction with FIGS. 1-25. In step 460, a processed signal is generated based on outbound data, wherein the processed signal includes one of: a baseband signal and a low intermediate frequency signal. In step 462, the processed signal is up-converted to generate an up-converted signal. In step 464, a first plurality of delayed signals is generated from the up-converted signal wherein a delayed signal of the first plurality of delayed signals is scaled based on one of a first plurality of coefficients, wherein the first plurality of coefficients are selected based on a control signal. In step 466, a filtered up-converted signal is generated by combining the up-converted signal and the first plurality of delayed signals. In step 468, the control signal is generated to attenuate at least one RF spur of the up-converted signal. In step 470, a transmit signal is generated by amplifying and amplitude modulating filtered up-converted signal based on the modulating signal.

In an embodiment of the present invention, step 466 generates a finite impulse response filtered up-converted signal, such as a notch filtered up-converted signal having a programmable notch frequency. Step 464 can include adjusting a number of the first plurality of delayed signals based on the control signal and/or selecting the first plurality of coefficients based on the control signal. The control signal can include selected values of the first plurality of coefficients. The up-converted signal can include an in-phase component and a quadrature-phase component and wherein the first plurality of delayed signals includes a plurality of in-phase delayed signals and a plurality of quadrature-phase delayed signals.

Figure 27:
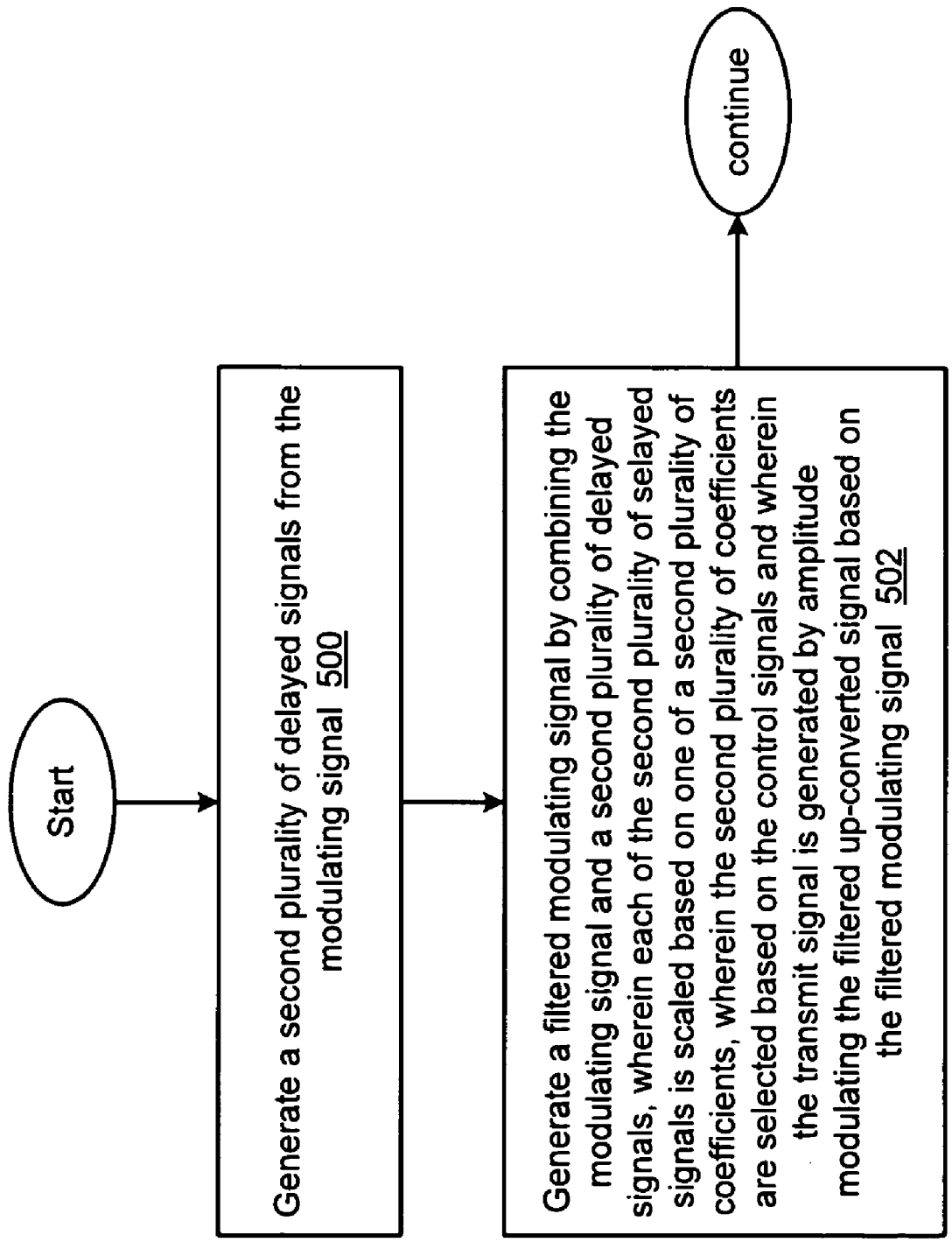
FIG. 27 is a flow chart of an embodiment of a method in accordance with the present invention.

FIG. 27 is a flow chart of an embodiment of a method in accordance with the present invention. In particular, a method is presented for use in conjunction with the method of FIG. 26. In step 500, a second plurality of delayed signals is generated from the modulating signal. In step 502, a filtered modulating signal is generated by combining the modulating signal and the second plurality of delayed signals, wherein each of the second plurality of delayed signals is scaled based on one of a second plurality of coefficients, wherein the second plurality of coefficients are selected based on the control signal, and wherein the transmit signal is generated in step 470 by amplitude modulating the filtered up-converted signal based on the filtered modulating signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. While the term phase modulation is used herein it includes the equivalent frequency modulation.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio frequency (RF) integrated circuit comprising:
an RF receiver that generates inbound data based on an inbound RF signal;
a RF transmitter that includes:
a transmitter processing module that generates a processed signal and a modulating signal based on outbound data, wherein the processed signal includes one of: a baseband signal and a low intermediate frequency signal;
an up-conversion module, coupled to the transmitter processing module, that up-converts the processed signal to generate an up-converted signal;

a first programmable filter module, coupled to the up-conversion module, that generates a first plurality of delayed signals from the up-converted signal and that generates a filtered up-converted signal by combining the up-converted signal and the first plurality of delayed signals, wherein a delayed signal of the first plurality of delayed signals is scaled based on one of a first plurality of coefficients, wherein the first plurality of coefficients are selected based on a control signal;

a radio transmitter front-end, coupled to the first programmable filter module, that includes a polar amplifier that amplifies and amplitude modulates the filtered up-converted signal based on the modulating signal to generate a transmit signal; and a processing module, coupled to the first programmable filter module, that generates the control signal to attenuate at least one RF spur of the up-converted signal.

2. The RF integrated circuit of claim 1 further comprising: a second programmable filter module, coupled to the transmitter processing module, that generates a second plurality of delayed signals from the modulating signal and that generates a filtered modulating signal by combining the modulating signal and the second plurality of delayed signals, wherein each of the second plurality of delayed signals is scaled based on one of a second plurality of coefficients, wherein the second plurality of coefficients are selected based on the control signal;

wherein the polar amplifier amplitude modulates the filtered up-converted signal based on the filtered modulating signal.

3. The RF integrated circuit of claim 1 wherein the programmable filter module includes a finite impulse response filter.

4. The RF integrated circuit of claim 1 wherein the programmable filter module includes a notch filter having a programmable notch frequency.

5. The RF integrated circuit of claim 1 wherein the programmable filter module includes a control module that adjusts a number of the first plurality of delayed signals based on the control signal.

6. The RF integrated circuit of claim 1 wherein the programmable filter module includes a control module that selects the first plurality of coefficients based on the control signal.

7. The RF integrated circuit of claim 1 wherein the control signal includes selected values of the first plurality of coefficients.

8. The RF integrated circuit of claim 1 wherein the up-converted signal includes an in-phase component and a quadrature-phase component and wherein the first plurality of delayed signals includes a plurality of in-phase delayed signals and a plurality of quadrature-phase delayed signals.

9. A radio frequency (RF) transmitter comprising:
a transmitter processing module that generates a processed signal and a modulating signal based on outbound data, wherein the processed signal includes one of:
a baseband signal and a low intermediate frequency signal;
an up-conversion module, coupled to the transmitter processing module, that up-converts the processed signal to generate an up-converted signal;
a programmable filter module, coupled to the up-conversion module, that generates a first plurality of delayed signals from the up-converted signal and that generates a filtered up-converted signal by combining the up-converted signal and the first plurality of delayed signals, wherein a delayed signal of the first plurality of delayed signals is scaled based on one of a first plurality of coefficients, wherein the first plurality of coefficients are selected based on a control signal;

a radio transmitter front-end, coupled to the first programmable filter module, that includes a polar amplifier that amplifies and amplitude modulates the filtered up-converted signal based on the modulating signal to generate a transmit signal; and a processing module, coupled to the first programmable filter module, that generates the control signal to attenuate at least one RF spur of the up-converted signal.

10. The RF transmitter circuit of claim 9 further comprising:
a second programmable filter module, coupled to the transmitter processing module, that generates a second plurality of delayed signals from the modulating signal and that generates a filtered modulating signal by combining the modulating signal and the second plurality of delayed signals, wherein each of the second plurality of delayed signals is scaled based on one of a second plurality of coefficients, wherein the second plurality of coefficients are selected based on the control signal;

wherein the polar amplifier amplitude modulates the filtered up-converted signal based on the filtered modulating signal.

11. The RF transmitter circuit of claim 9 wherein the programmable filter module includes a finite impulse response filter.

12. The RF transmitter circuit of claim 9 wherein the programmable filter module includes a notch filter having a programmable notch frequency.

13. The RF transmitter circuit of claim 9 wherein the programmable filter module includes a control module that adjusts a number of the first plurality of delayed signals based on the control signal.

14. The RF transmitter circuit of claim 9 wherein the programmable filter module includes a control module that selects the first plurality of coefficients based on the control signal.

15. The RF transmitter circuit of claim 9 wherein the control signal includes selected values of the first plurality of coefficients.

16. The RF transmitter circuit of claim 9 wherein the up-converted signal includes an in-phase component and a quadrature-phase component and wherein the first plurality of delayed signals includes a plurality of in-phase delayed signals and a plurality of quadrature-phase delayed signals.

17. A method comprising:
generating a processed signal based on outbound data, wherein the processed signal includes one of: a baseband signal and a low intermediate frequency signal;
up-converting the processed signal to generate an up-converted signal;
generating a first plurality of delayed signals from the up-converted signal wherein a delayed signal of the first plurality of delayed signals is scaled based on one of a first plurality of coefficients, wherein the first plurality of coefficients are selected based on a control signal;
generating a filtered up-converted signal by combining the up-converted signal and the first plurality of delayed signals;
generating the control signal to attenuate at least one RF spur of the up-converted signal; and
generating a transmit signal by amplifying and amplitude modulating filtered up-converted signal based on the modulating signal.

18. The method of claim 17 wherein generating the filtered up-converted signal generates a finite impulse response filtered up-converted signal.

19. The method of claim 17 wherein generating the filtered up-converted signal generates a notch filtered up-converted signal having a programmable notch frequency.

20. The method of claim 17 wherein generating the first plurality of delayed signals includes adjusting a number of the first plurality of delayed signals based on the control signal.

21. The method of claim 17 wherein generating the first plurality of delayed signals includes selecting the first plurality of coefficients based on the control signal.

22. The method of claim 17 wherein the control signal includes selected values of the first plurality of coefficients.

23. The method of claim 17 wherein the up-converted signal includes an in-phase component and a quadrature-phase component and wherein the first plurality of delayed signals includes a plurality of in-phase delayed signals and a plurality of quadrature-phase delayed signals.

24. The method of claim 17 further comprising:
generating a second plurality of delayed signals from the modulating signal; and
generating a filtered modulating signal by combining the modulating signal and the second plurality of delayed signals, wherein each of the second plurality of delayed signals is scaled based on one of a second plurality of coefficients, wherein the second plurality of coefficients are selected based on the control signal;
wherein the transmit signal is generated by amplitude modulating the filtered up-converted signal based on the filtered modulating signal.

* * * * *